United States Patent
Uehara

(10) Patent No.: US 11,630,382 B2
(45) Date of Patent: Apr. 18, 2023

(54) OPTICAL ELEMENT, LIGHT SOURCE DEVICE, IMAGE DISPLAY DEVICE, AND PROJECTOR

(71) Applicant: SEIKO EPSON CORPORATION, Tokyo (JP)

(72) Inventor: Katsuyuki Uehara, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/405,801

(22) Filed: Aug. 18, 2021

(65) Prior Publication Data
US 2022/0057701 A1 Feb. 24, 2022

(30) Foreign Application Priority Data
Aug. 19, 2020 (JP) ................ JP2020-138568

(51) Int. Cl.
*G03B 21/20* (2006.01)
*G02B 27/09* (2006.01)

(52) U.S. Cl.
CPC ........ *G03B 21/204* (2013.01); *G02B 27/0961* (2013.01)

(58) Field of Classification Search
CPC ............ G03B 21/204; G03B 21/208; G03B 21/2066; G03B 21/2073; G02B 27/0961; G02B 27/0927

See application file for complete search history.

(56) References Cited

U.S. PATENT DOCUMENTS

| | | | | |
|---|---|---|---|---|
| 6,102,545 A | * | 8/2000 | Ogino | H04N 9/315 353/38 |
| 6,144,426 A | * | 11/2000 | Yamazaki | G02F 1/133621 349/5 |
| 6,386,709 B1 | | 5/2002 | Seki | |
| 6,678,023 B1 | * | 1/2004 | Yamazaki | G02F 1/133621 349/95 |
| 8,757,849 B2 | * | 6/2014 | Brick | G03B 21/208 362/333 |
| 9,122,097 B2 | * | 9/2015 | Uchida | G02B 6/0053 |
| 2004/0130790 A1 | * | 7/2004 | Sales | G02B 27/0961 359/619 |
| 2006/0007521 A1 | | 1/2006 | Akiyama | |
| 2008/0037119 A1 | | 2/2008 | Miyazawa | |

(Continued)

FOREIGN PATENT DOCUMENTS

| | | |
|---|---|---|
| CN | 102859425 A | 1/2013 |
| JP | H06-265887 A | 9/1994 |

(Continued)

*Primary Examiner* — Magda Cruz
(74) *Attorney, Agent, or Firm* — Oliff PLC

(57) ABSTRACT

An optical element includes a first multi-lens surface and a second multi-lens surface. The first multi-lens surface has m areas arranged in an array, the m areas including a plurality of first cells. The second multi-lens surface has m second cells arranged in an array, the m second cells corresponding to the m areas. Light enters the first multi-lens surface. The light is emitted from the second multi-lens surface. The m areas of the first multi-lens surface each have n first cells. A focal plane of the m second cells is located at an emission side of the n first cells. The number m is a natural number no smaller than 2, and the number n is a natural number no smaller than 2.

14 Claims, 11 Drawing Sheets

(56) References Cited

U.S. PATENT DOCUMENTS

| | | | |
|---|---|---|---|
| 2011/0234985 A1* | 9/2011 | Ryf | G03B 21/14 |
| | | | 353/38 |
| 2011/0234998 A1 | 9/2011 | Kurosaki | |
| 2013/0057786 A1* | 3/2013 | Watson | H04N 9/3167 |
| | | | 349/5 |
| 2013/0201424 A1 | 8/2013 | Uchida et al. | |
| 2013/0258294 A1* | 10/2013 | Kaneda | G02B 27/0927 |
| | | | 353/38 |
| 2016/0182871 A1* | 6/2016 | Kurashige | G02B 27/48 |
| | | | 353/38 |
| 2018/0210329 A1* | 7/2018 | Sakata | G03B 21/2013 |
| 2020/0218077 A1* | 7/2020 | Li | G02B 3/0068 |

FOREIGN PATENT DOCUMENTS

| | | | | |
|---|---|---|---|---|
| JP | 2001-056435 A | | 2/2001 | |
| JP | 2006-317887 A | | 11/2006 | |
| JP | 2007-304563 A | | 11/2007 | |
| JP | 2011-197597 A | | 10/2011 | |
| JP | 2013-535018 A | | 9/2013 | |
| JP | 2014-153417 A | | 8/2014 | |
| JP | 2016-142901 A | | 8/2016 | |
| JP | 2019-028120 A | | 2/2019 | |
| JP | 2020-030309 A | | 2/2020 | |
| KR | 20070099573 A | * | 10/2007 | G02B 27/09 |

* cited by examiner

OPTICAL ELEMENT, LIGHT SOURCE DEVICE, IMAGE DISPLAY DEVICE, AND PROJECTOR

The present application is based on, and claims priority from JP Application Serial Number 2020-138568, filed Aug. 19, 2020, the disclosure of which is hereby incorporated by reference herein in its entirety.

BACKGROUND

1. Technical Field

The present disclosure relates to an optical element, alight source device, an image display device, and a projector.

2. Related Art

In the field of an image display device such as a projector, there is proposed a light source device using fluorescence emitted from a phosphor when irradiating the phosphor with excitation light emitted from a light source. In the light source device of this kind, in order to homogenize the illuminance distribution of the excitation light on the phosphor, there is used a multi-lens array in some cases.

In JP-A-2011-197597 (Document 1), there is disclosed a light source unit provided with an excitation light source, a phosphor plate for emitting green light when receiving the excitation light, a microlens array, a red light source, and a blue light source. In this light source unit, the microlens array has a configuration in which a plurality of micro-convex lenses is arranged in an array, and is disposed between the excitation light source and the phosphor plate. The excitation light emitted from the excitation light source is divided by the microlens array into a plurality of light beams, and the phosphor plate is irradiated with the plurality of light beams superimposed on each other to thereby be illuminated with substantially homogenous illuminance. However, in this configuration, there is a problem that the wavelength conversion efficiency decreases with rise in temperature of the phosphor.

As a method of increasing the wavelength conversion efficiency of the phosphor, in JP-A-2019-28120 (Document 2), there is disclosed an illumination device provided with a light source, a lens array disposed on a light path of excitation light emitted from the light source, and a wavelength conversion element for emitting a plurality of fluorescent beams in response to a plurality of partial light beams emitted from the lens array. In this illumination device, the plurality of partial light beams emitted from the lens array enters a plurality of areas different from each other in the wavelength conversion element without being superimposed on the wavelength conversion element.

In the illumination device in Document 2, the partial light beam emitted from one of the lenses constituting the lens array enters one of the areas of the wavelength conversion element thus divided. As described above, in the illumination device in Document 2, since one of the lenses of the lens array and one of the areas of the wavelength conversion element correspond to each other, there is a possibility that the optical system of the illumination device including the lens array and the wavelength conversion element grows in size, and at the same time, illuminance unevenness on the wavelength conversion element increases.

Although there is hereinabove described when the illumination target is the wavelength conversion element, even when the lens array described in Document 2 is applied when the illumination target is a light modulation device such as a liquid crystal panel, there is substantially the same problem as described above such as the growth in size of the optical system and the illuminance unevenness.

SUMMARY

In view of the problems described above, an optical element according to an aspect of the present disclosure includes a first multi-lens surface having m areas arranged in an array, the m areas including a plurality of first cells, and a second multi-lens surface having m second cells arranged in an array, the m second cells corresponding to the m areas, wherein light enters the first multi-lens surface, the light is emitted from the second multi-lens surface, the m areas of the first multi-lens surface each have n first cells, a focal plane of the m second cells is located at an emission side of the n first cells, the number m is a natural number no smaller than 2, and the number n is a natural number no smaller than 2.

A light source device according to another aspect of the present disclosure includes a light source configured to emit light, and the optical element according to the aspect of the present disclosure which the light emitted from the light source enters.

A light source device according to another aspect of the present disclosure includes a light source configured to emit excitation light, the optical element according to the aspect of the present disclosure which the excitation light emitted from the light source enters, and a wavelength conversion element configured to convert a wavelength of the excitation light emitted from the optical element and emit converted light.

A light source device according to still another aspect of the present disclosure includes a light source configured to emit light, the optical element according to the aspect of the present disclosure which the light emitted from the light source enters, and a light modulation element configured to modulate the light emitted from the optical element.

An image display device according to another aspect of the present disclosure includes a light source configured to emit light, the optical element according to the aspect of the present disclosure which the light emitted from the light source enters, and a light modulation device configured to modulate the light emitted from the optical element in accordance with image information.

A projector according to another aspect of the present disclosure includes the light source device according to the aspect of the present disclosure, a light modulation device configured to modulate the light emitted from the light source device in accordance with image information, and a projection optical device configured to project the light modulated by the light modulation device.

DESCRIPTION OF EXEMPLARY EMBODIMENTS

First Embodiment

A first embodiment of the present disclosure will hereinafter be described using FIG. 1 through FIG. 7.

It should be noted that in each of the drawings described below, the constituents are shown with the scale ratios of respective sizes set differently between the constituents in some cases in order to facilitate the visualization of each of the constituents.
Configuration of Projector An example of a projector according to the present embodiment will be described.

Figure 1:
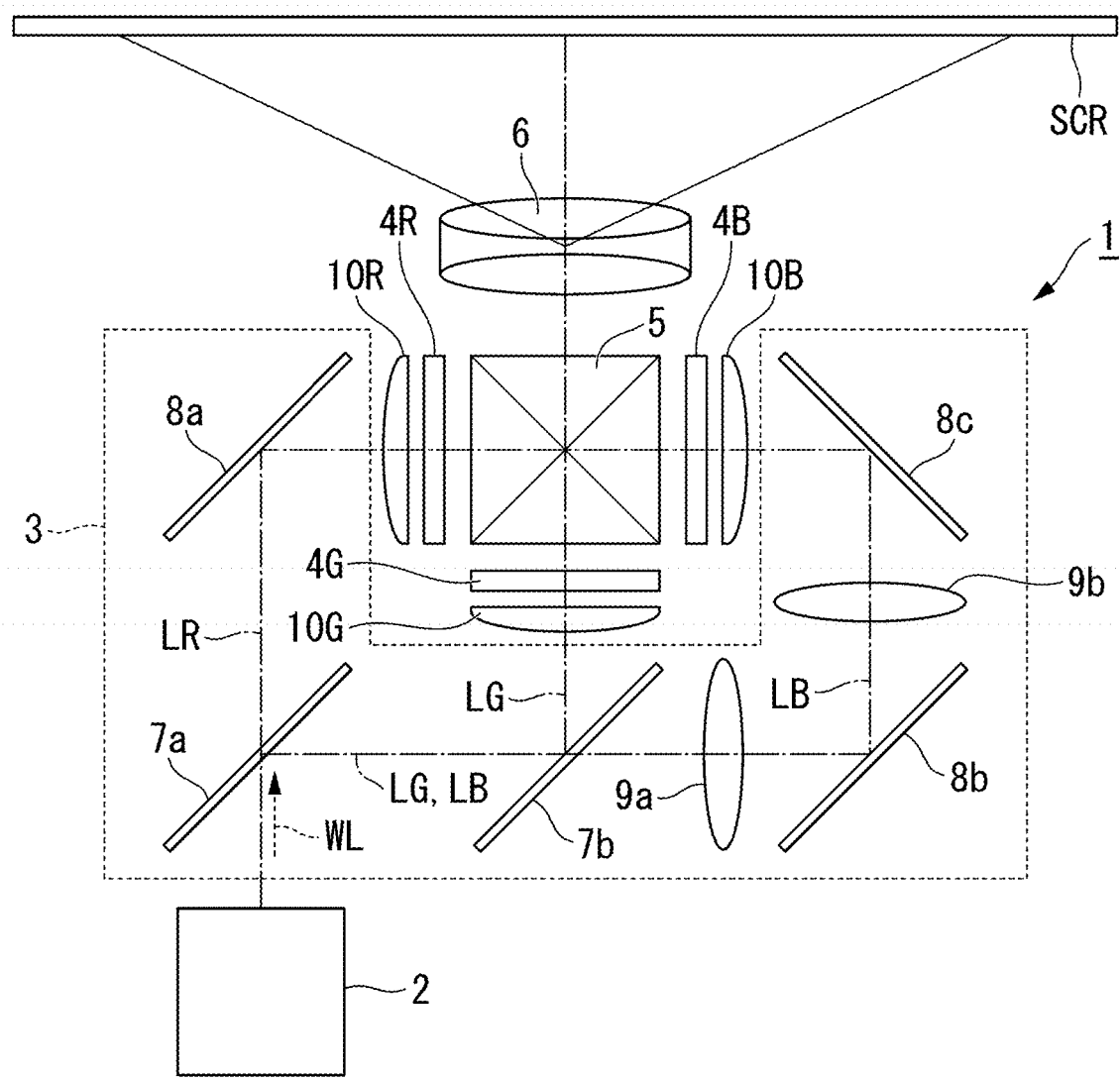
FIG. 1 is a schematic configuration diagram of a projector according to a first embodiment.

FIG. 1 is a diagram showing a schematic configuration of the projector 1 according to the present embodiment.

As shown in FIG. 1, the projector 1 according to the present embodiment is a projection-type image display device for displaying a color image on a screen SCR. The projector 1 is provided with an illumination device 2, a color separation optical system 3, a light modulation device 4R, a light modulation device 4G, a light modulation device 4B, a combining optical system 5, and a projection optical device 6. The configuration of the illumination device 2 will be described later in detail.

The color separation optical system 3 is provided with a first dichroic mirror 7a, a second dichroic mirror 7b, a reflecting mirror 8a, a reflecting mirror 8b, a reflecting mirror 8c, a relay lens 9a, and a relay lens 9b. The color separation optical system 3 separates the illumination light WL having been emitted from the illumination device 2 into red light LR, green light LG, and blue light LB. The color separation optical system 3 guides the red light LR to the light modulation device 4R, guides the green light LG to the light modulation device 4G, and guides the blue light LB to the light modulation device 4B.

A field lens 10R is disposed between the color separation optical system 3 and the light modulation device 4R. The field lens 10R substantially collimates the incident light, and emits the result toward the light modulation device 4R. A field lens 10G is disposed between the color separation optical system 3 and the light modulation device 4G. The field lens 10G substantially collimates the incident light, and emits the result toward the light modulation device 4G. A field lens 10B is disposed between the color separation optical system 3 and the light modulation device 4B. The field lens 10B substantially collimates the incident light, and emits the result toward the light modulation device 4B.

The first dichroic mirror 7a transmits a red light component, and reflects a green light component and a blue light component. The second dichroic mirror 7b reflects the green light component, and transmits the blue light component. The reflecting mirror 8a reflects the red light component. The reflecting mirror 8b and the reflecting mirror 8c reflect the blue light component.

The red light LR transmitted through the first dichroic mirror 7a is reflected by the reflecting mirror 8a, and is then transmitted through the field lens 10R to enter an image formation area of the light modulation device 4R for the red light. The green light LG reflected by the first dichroic mirror 7a is further reflected by the second dichroic mirror 7b, and is then transmitted through the field lens 10G to enter an image formation area of the light modulation device 4G for the green light. The blue light LB which is reflected by the first dichroic mirror 7a, and is then transmitted through the second dichroic mirror 7b enters an image formation area of the light modulation device 4B for the blue light via the relay lens 9a, the reflecting mirror 8b at the incident side, the relay lens 9b, the reflecting mirror 8c at the exit side, and the field lens 10B.

The light modulation device 4R, the light modulation device 4G, and the light modulation device 4B each modulate the colored light having entered the light modulation device in accordance with image information to thereby form image light. The light modulation device 4R, the light modulation device 4G, and the light modulation device 4B are each formed of a liquid crystal light valve. Although not shown in the drawings, at the light incident side of each of the light modulation device 4R, the light modulation device 4G, and the light modulation device 4B, there is disposed an incident side polarization plate. At the light exit side of each of the light modulation device 4R, the light modulation device 4G, and the light modulation device 4B, there is disposed an exit side polarization plate.

The combining optical system 5 combines red image light emitted from the light modulation device 4R, green image light emitted from the light modulation device 4G, and blue image light emitted from the light modulation device 4B with each other to form full-color image light. The combining optical system 5 is formed of a cross dichroic prism which has four right triangular prisms bonded to each other, and which has a substantially square shape in a plan view. On the boundary surfaces on which the right triangular prisms are bonded to each other, there are formed dielectric multilayer films.

The image light emitted from the combining optical system 5 is projected by the projection optical device 6 in an enlarged manner to form an image on the screen SCR. In other words, the projection optical device 6 projects the full-color image light emitted from the light modulation device 4R, the light modulation device 4G, and the light modulation device 4B. The projection optical device 6 is constituted by a plurality of projection lenses.

Configuration of Illumination Device

An example of the illumination device 2 according to the present embodiment will be described.

Figure 2:
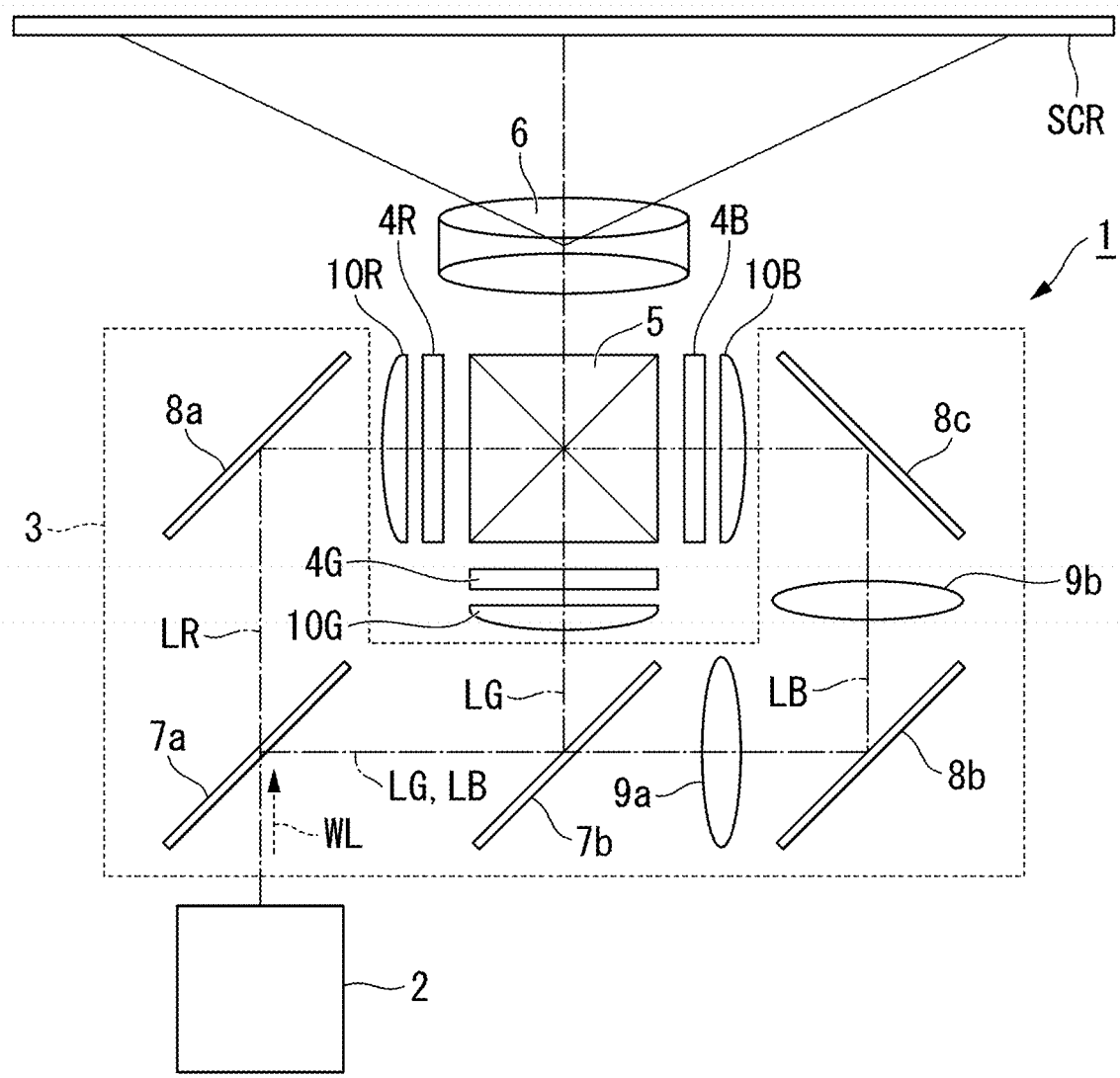
FIG. 2 is a schematic configuration diagram of an illumination device according to the first embodiment.

FIG. 2 is a diagram showing a schematic configuration of the illumination device 2.

As shown in FIG. 2, the illumination device 2 is provided with a light source device 20, a polarization split element 25, a first light collection optical system 26, a second wave plate 282, a second light collection optical system 29, a diffusely reflecting element 30, an integrator optical system 31, a polarization conversion element 32, and a superimposing lens 33a. The integrator optical system 31 and the superimposing lens 33a constitute a superimposing optical system 33.

The light source device 20 is provided with a light source 21, a collimator optical system 22, an afocal optical system 23, a first wave plate 281, an optical element 24, and a wavelength conversion element 40.

In FIG. 2, using an XYZ orthogonal coordinate system, an axis along a principal ray of the pencil BL emitted from the light source 21 is defined as an optical axis ax1 of the light source 21, and an axis parallel to the optical axis ax1 is defined as an X axis. An axis along a principal ray of fluorescence YL emitted from the wavelength conversion element 40 is defined as an optical axis ax2 of the wavelength conversion element 40, and an axis parallel to the optical axis ax2 is defined as a Y axis. Further, an axis perpendicular to the X axis and the Y axis is defined as a Z axis.

The light source 21, the collimator optical system 22, the afocal optical system 23, the first wave plate 281, the optical element 24, the polarization split element 25, the second wave plate 282, the second light collection optical system 29, and the diffusely reflecting element 30 are arranged side by side in series on the optical axis ax1 of the light source 21. The wavelength conversion element 40, the first light collection optical system 26, the polarization split element 25, the integrator optical system 31, the polarization conversion element 32, and the superimposing lens 33a are arranged side by side in series on the optical axis ax2 of the wavelength conversion element 40. The optical axis ax1 and the optical axis ax2 are located in the same plane, and are perpendicular to each other.

The light source 21 is provided with a plurality of light emitting elements 211 for emitting the excitation light. The plurality of light emitting elements 211 is arranged in an array in a plane perpendicular to the optical axis ax1. In the case of the present embodiment, the light source 21 has a configuration in which four sets of light source units each having the four light emitting elements 211 arranged in a line along the Y axis are arranged along the Z axis perpendicular to the Y axis in which the four light emitting elements 211 are arranged. In other words, the light source 21 has a configuration having the sixteen light emitting elements 211 arranged in an array of a 4×4 matrix. It should be noted that the number and the arrangement of the light emitting elements 211 are not limited to those of the configuration described above, and the number of the light emitting elements 211 can be one.

The light emitting elements 211 are each formed of a semiconductor laser element for emitting a laser beam BL1. The semiconductor laser element emits a blue light beam in a first wavelength band, specifically, the laser beam BL1 in a first wavelength band with a peak wavelength of, for example, 460 nm. Therefore, the light source 21 emits the pencil BL including a plurality of laser beams BL1. The pencil BL in the present embodiment corresponds to light in the appended claims.

The pencil BL emitted from the light source 21 enters the collimator optical system 22. The collimator optical system 22 converts the pencil BL emitted from the light source 21 into substantially parallel light. The collimator optical system 22 is constituted by a plurality of collimator lenses 221 arranged in an array. Each of the collimator lenses 221 is disposed at a position which the laser beam BL1 emitted from corresponding one of the light emitting elements 211 enters.

The pencil BL having been transmitted through the collimator optical system 22 enters the afocal optical system 23. The afocal optical system 23 adjusts the diametrical size of the pencil BL, namely the thickness of the pencil BL. The afocal optical system 23 is constituted by a convex lens 231 and a concave lens 232.

The pencil BL having passed through the afocal optical system 23 enters the first wave plate 281. The first wave plate 281 is formed of, for example, a ½ wave plate which is made rotatable. The pencil BL which has just been emitted from the light source 21 is linearly polarized light having a predetermined polarization direction. By appropriately setting the rotational angle of the first wave plate 281, it is possible to convert the pencil BL transmitted through the first wave plate 281 into the pencil BL including an S-polarization component and a P-polarization component with respect to the polarization split element 25 at a predetermined ratio. By changing the rotational angle of the first wave plate 281, it is possible to adjust the ratio between the S-polarization component and the P-polarization component.

The pencil BL having passed through the first wave plate 281 enters the optical element 24. The optical element 24 substantially homogenizes an illuminance distribution of the pencil BL in the wavelength conversion element 40 and the diffusely reflecting element 30 as a target illumination area. The configuration of the optical element 24 will be described later in detail.

The pencil BL including the S-polarization component and the P-polarization component emitted from the optical element 24 enters the polarization split element 25. The polarization split element 25 is formed of, for example, a polarization beam splitter having wavelength selectivity. The polarization split element 25 is arranged so as to form an angle of 45° with each of the optical axis ax1 and the optical axis ax2.

The polarization split element 25 has a polarization split function of splitting the pencil BL into a pencil BLs as the S-polarization component with respect to the polarization split element 25 and a pencil BLp as the P-polarization component. Specifically, the polarization split element 25 reflects the pencil BLs as the S-polarization component to guide the pencil BLs to the wavelength conversion element 40, and transmits the pencil BLp as the P-polarization component to guide the pencil BLp to the diffusely reflecting element 30. Further, the polarization split element 25 has a color separation function of transmitting a yellow light component different in wavelength band from the pencil BL as blue light irrespective of the polarization state of the yellow light component in addition to the polarization split function.

The pencil BLs as the S-polarized light having been reflected by the polarization split element 25 enters the first light collection optical system 26. The pencil BLs emitted from the polarization split element 25 enters the first light collection optical system 26, and the first light collection optical system 26 converges the pencil BLs toward the wavelength conversion element 40. The first light collection optical system 26 is constituted by a first lens 261 and a second lens 262. The first lens 261 and the second lens 262 are each formed of a convex lens. The pencil BLs having been emitted from the first light collection optical system 26 enters the wavelength conversion element 40 in a converged state.

The wavelength conversion element 40 is provided with a base member 41, a wavelength conversion layer 42, and a heatsink 44. In the present embodiment, the wavelength conversion layer 42 is formed of a phosphor. In the present embodiment, as the wavelength conversion element 40, there is used a stationary wavelength conversion element which does not have a drive source such as a motor, and is not made rotatable. The pencil BLs converged by the first lens 261 and the second lens 262 enters the wavelength conversion element 40.

The wavelength conversion layer 42 includes a ceramic phosphor for converting the pencil BLs into the fluorescence YL in a second wavelength band different from the first wavelength band. The second wavelength band is in a range of, for example, 490 through 750 nm, and the fluorescence YL is yellow light including the green light component and the red light component. The wavelength conversion layer 42 includes, for example, an yttrium aluminum garnet (YAG) type phosphor. Citing YAG:Ce including cerium (Ce) as an activator agent as an example, as the wavelength conversion layer 42, there can be used a material obtained by mixing raw powder including constituent elements such as $Y_2O_3$, $Al_2O_3$, and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process, or a thermal plasma process. Further, it is possible for the wavelength conversion layer 42 to include a scattering element made of, for example, a plurality of bubbles. The wavelength conversion layer 42 includes the scattering element to thereby make it possible to enhance the extraction efficiency of the fluorescence YL.

The wavelength conversion layer 42 is bonded to a first surface 41a of the base member 41 with a bonding material (not shown). As the bonding material, there is used, for example, a nano-silver sintered metal material. The base member 41 is formed of a metal material high in optical reflectance such as aluminum or silver. The first surface 41a of the base member 41 reflects the light proceeding inside the wavelength conversion layer 42. Further, it is possible to further dispose a reflecting layer between the first surface 41a of the base member 41 and the wavelength conversion layer 42.

The heatsink 44 has a plurality of fins. The heatsink 44 is disposed on a second surface 41b of the base member 41. The heatsink 44 is fixed to the base member 41 with, for example, metal bonding. In the wavelength conversion element 40, since the heat of the wavelength conversion layer 42 can be released via the heatsink 44, the heat deterioration of the wavelength conversion layer 42 can be prevented.

The fluorescence YL having a yellow color having been generated by the wavelength conversion element 40 is substantially collimated by the first light collection optical system 26, and then enters the polarization split element 25. As described above, since the polarization split element 25 has a property of transmitting the yellow light component irrespective of the polarization state, the fluorescence YL is transmitted through the polarization split element 25.

Meanwhile, the pencil BLp as the P-polarized light having been emitted from the polarization split element 25 enters the second wave plate 282. The second wave plate 282 is formed of a ¼ wave plate disposed in the light path of the pencil BLp between the polarization split element 25 and the diffusely reflecting element 30. The pencil BLp as the P-polarized light having been emitted from the polarization split element 25 is converted by the second wave plate 282 into, for example, blue pencil BLc1 as clockwise circularly polarized light, and then enters the second light collection optical system 29.

The second light collection optical system 29 is constituted by a first lens 291 and a second lens 292. The first lens 291 and the second lens 292 are each formed of a convex lens. The second light collection optical system 29 makes the blue pencil BLc1 enter the diffusely reflecting element 30 in a converged state.

The diffusely reflecting element 30 is disposed on the light path of the pencil BLp emitted from the polarization split element 25. The blue pencil BLc1 having been emitted from the second light collection optical system 29 is diffusely reflected by the diffusely reflecting element 30 toward the polarization split element 25. It is desirable for the diffusely reflecting element 30 to reflect the blue pencil BLc1 in an angular distribution approximate to the Lambertian diffusion, and at the same time, not to disturb the polarization state of the blue pencil BLc1.

The light diffusely reflected by the diffusely reflecting element 30 is hereinafter referred to as a blue pencil BLc2. In the present embodiment, by diffusely reflecting the blue pencil BLc1, there can be obtained the blue pencil BLc2 having a substantially homogenous illuminance distribution. For example, the blue pencil BLc1 as the clockwise circularly polarized light is diffusely reflected by the diffusely reflecting element 30 to thereby be converted into the blue pencil BLc2 as the counterclockwise circularly polarized light.

The blue pencil BLc2 is converted by the second light collection optical system 29 into a parallel pencil, and then enters the second wave plate 282 once again. The blue pencil BLc2 as the counterclockwise circularly polarized light is converted by the second wave plate 282 into a blue pencil BLs1 as S-polarized light. The blue pencil BLs1 as the S-polarized light is reflected by the polarization split element 25 toward the integrator optical system 31.

In such a manner, the blue pencil BLs1 is combined with the fluorescence YL having been transmitted through the polarization split element 25, and is used as the illumination light WL. Specifically, the blue pencil BLs1 and the fluorescence YL are emitted from the polarization split element 25 toward the respective directions the same as each other, and thus, there is generated the illumination light WL as the white light having the blue pencil BLs1 and the fluorescence YL as the yellow light combined with each other.

The illumination light WL is emitted toward the integrator optical system 31. The integrator optical system 31 is constituted by a first lens array 31a and a second lens array 31b. The first lens array 31a and the second lens array 31b each have a configuration in which a plurality of lenses is arranged in an array.

The illumination light WL having been transmitted through the integrator optical system 31 enters the polarization conversion element 32. The polarization conversion element 32 has a polarization split film and a wave plate not shown. The polarization conversion element 32 converts the illumination light WL including the fluorescence YL as unpolarized light into linearly polarized light which is made to enter the light modulation device 4R, the light modulation device 4G, and the light modulation device 4B. Specifically, the polarization conversion element 32 converts the illumination light WL into linearly polarized light having a polarization direction corresponding to a transmission axis of the incident side polarization plate of each of the light modulation device 4R, the light modulation device 4G, and the light modulation device 4B.

The illumination light WL having been transmitted through the polarization conversion element 32 enters the superimposing lens 33a. The superimposing lens 33a homogenizes the illuminance distribution of the illumination light WL in the image formation area of each of the light modulation device 4R, the light modulation device 4G, and the light modulation device 4B in cooperation with the integrator optical system 31. The illumination device 2 generates the illumination light WL in such a manner as described above.

Configuration of Optical Element

Hereinafter, a configuration of the optical element 24 will hereinafter be described.

Figure 3:
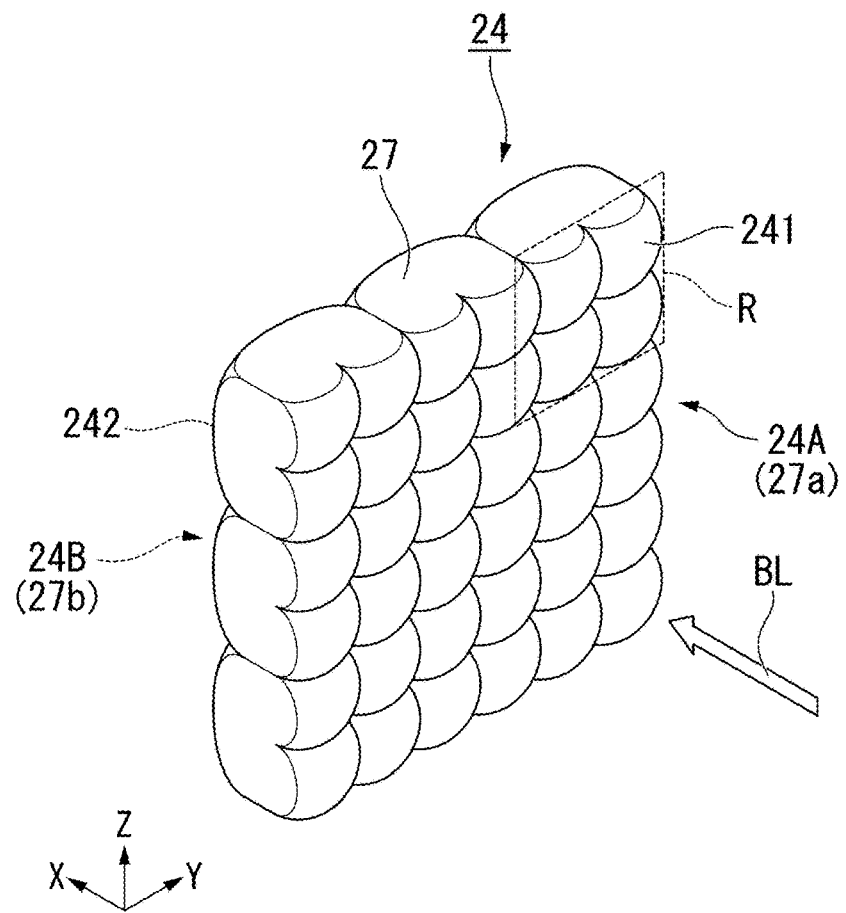
FIG. 3 is a perspective view of an optical element according to the first embodiment.

FIG. 3 is a perspective view of the optical element 24.

As shown in FIG. 3, the optical element 24 according to the present embodiment is provided with a first multi-lens surface 24A having m areas R arranged in an array, and a second multi-lens surface 24B having m second cells 242 arranged in an array so as to correspond to the m areas R. In the optical element 24, the pencil BL enters the first multi-lens surface 24A, and is then emitted from the second multi-lens surface 24B. The m areas R of the first multi-lens surface 24A each have n first cells 241. The number m is a natural number no smaller than 2, and the number n is a natural number no smaller than 2.

As a specific configuration, the optical element 24 according to the present embodiment is provided with a lens array 27 having a first surface 27a which the pencil BL enters, and a second surface 27b from which the pencil BL having entered the first surface 27a is emitted. The lens array 27 can be formed of an inorganic material such as optical glass or quartz, or can also be formed of an organic material such as resin. The first multi-lens surface 24A is formed of the first surface 27a of the lens array 27, and the second multi-lens surface 24B is formed of a second surface 27b of the lens array 27. In other words, the first multi-lens surface 24A and the second multi-lens surface 24B of the optical element 24 are respectively formed of the two surfaces 27a, 27b opposed to each other of the lens array 27.

In the following description, the constituents arranged in the Y-axis direction are described as a row, and the constituents arranged in the Z-axis direction are described as a column. In the case of the present embodiment, m=9 and n=4 are assumed. In other words, the first multi-lens surface 24A has a configuration in which nine areas R are arranged in an array of a 3×3 matrix. Further, the nine areas R of the first multi-lens surface 24A each have the four first cells 241. The four first cells 241 provided to each of the areas R are arranged in an array of a 2×2 matrix. Therefore, as a whole, the first multi-lens surface 24A has a configuration in which 36 first cells 241 are arranged in an array of a 6×6 matrix.

Further, the second multi-lens surface 24B has a configuration in which 9 second cells 242 are arranged in an array of a 3×3 matrix so as to correspond to the nine areas R of the first multi-lens surface 24A.

In the case of the present embodiment, the first cells 241 and the second cells 242 each have a shape of a convex lens. All of the first cells 241 constituting the first multi-lens surface 24A have the same size and the same curvature. Further, all of the second cells 242 constituting the second multi-lens surface 24B have the same size and the same curvature. Further, in the present embodiment, since the illumination target having a square shape is assumed, the shape of the second cell 242 viewed from the proceeding direction of the pencil BL is a square shape as a similar shape to the shape of the illumination target. Further, the shape of the first cell 241 viewed from the proceeding direction of the pencil BL is also the square shape.

Figure 4:
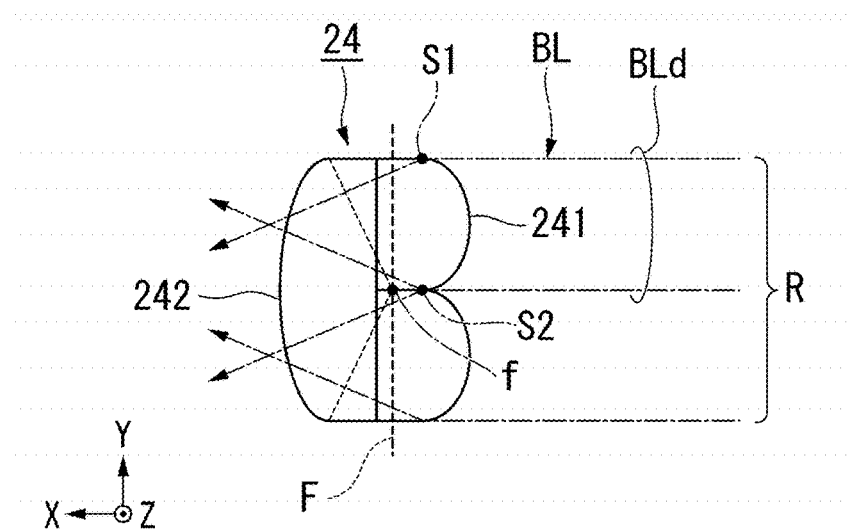
FIG. 4 is a schematic diagram for explaining an action of an optical element according to the first embodiment.

FIG. 4 is a schematic diagram for explaining an action of an optical element 24 according to the present embodiment. FIG. 4 shows just a portion corresponding to one of the areas R in the optical element 24.

As shown in FIG. 4, a focal plane F of the 9 second cells 242 is located at an emission side of the pencil BL from the four first cells 241. In the case of the present embodiment, since all of the second cells 242 have the same size and the same curvature, the focal points f of the 9 second cells 242 are formed at the same position in the X-axis direction. Therefore, the focal plane F is defined as a plane which includes these 9 focal points f, and is perpendicular to the X axis. Further, the first cell 241 is defined as a surface located between a tangent point S1 with the first cell 241 adjacent at one side to one of the first cells 241 and a tangent point S2 with the first cell 241 adjacent at the other side thereto. Further, an image of the pencil BL on the focal plane F is focused by each of the second cells 242 on the illumination target.

Principle of Embodiment

Hereinafter, the behavior of the pencil BL in the optical element 24 according to the present embodiment will be described.

First, an optical element 324 according to a comparative example is assumed.

Figure 6:
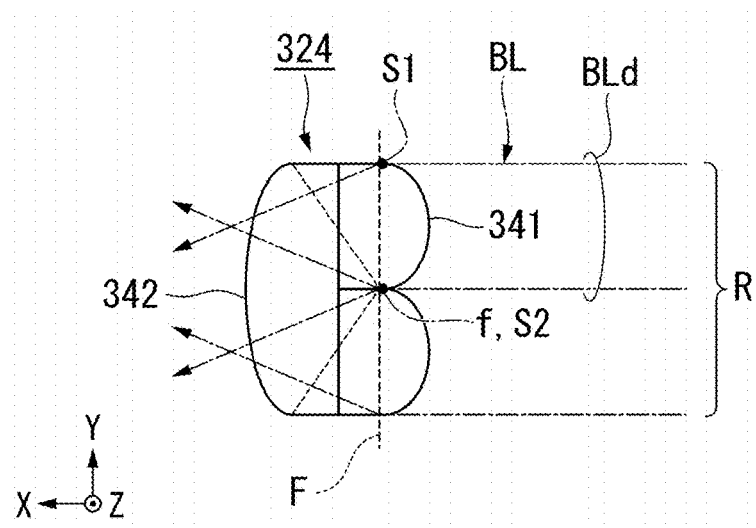
FIG. 6 is a schematic diagram for explaining an action of an optical element according to a comparative example.

FIG. 6 is a schematic diagram for explaining an action of an optical element 324 according to the comparative example. FIG. 6 shows just a portion corresponding to one of the areas R in the optical element 324.

As shown in FIG. 6, also in the optical element 324 according to the comparative example, similarly to the optical element 24 according to the present embodiment, the four first cells 341 are arranged in an array of a 2×2 matrix corresponding to each of the second cells 342. It should be noted that in the optical element 324 according to the comparative example, unlike the optical element 24 according to the present embodiment, the focal plane F of the second cell 342 is not located at the emission side of the four first cells 341, but is located on the four first cells 341. Specifically, in the example of FIG. 6, the focal plane F of the second cell 342 is formed at a position passing through the tangent point S1 and the tangent point S2.

As described above, the second cell 342 has a function of focusing an image of the pencil on the focal plane F on the illumination target. Further, the four first cells 341 have a function of dividing the pencil having entered one of the areas R into four partial pencils BLd. However, in the case of the optical element 324 according to the comparative example, since the focal plane F of the second cell 342 is located on the four first cells 341, no gap is formed between the partial pencils BLd adjacent to each other at this position.

Figure 7:
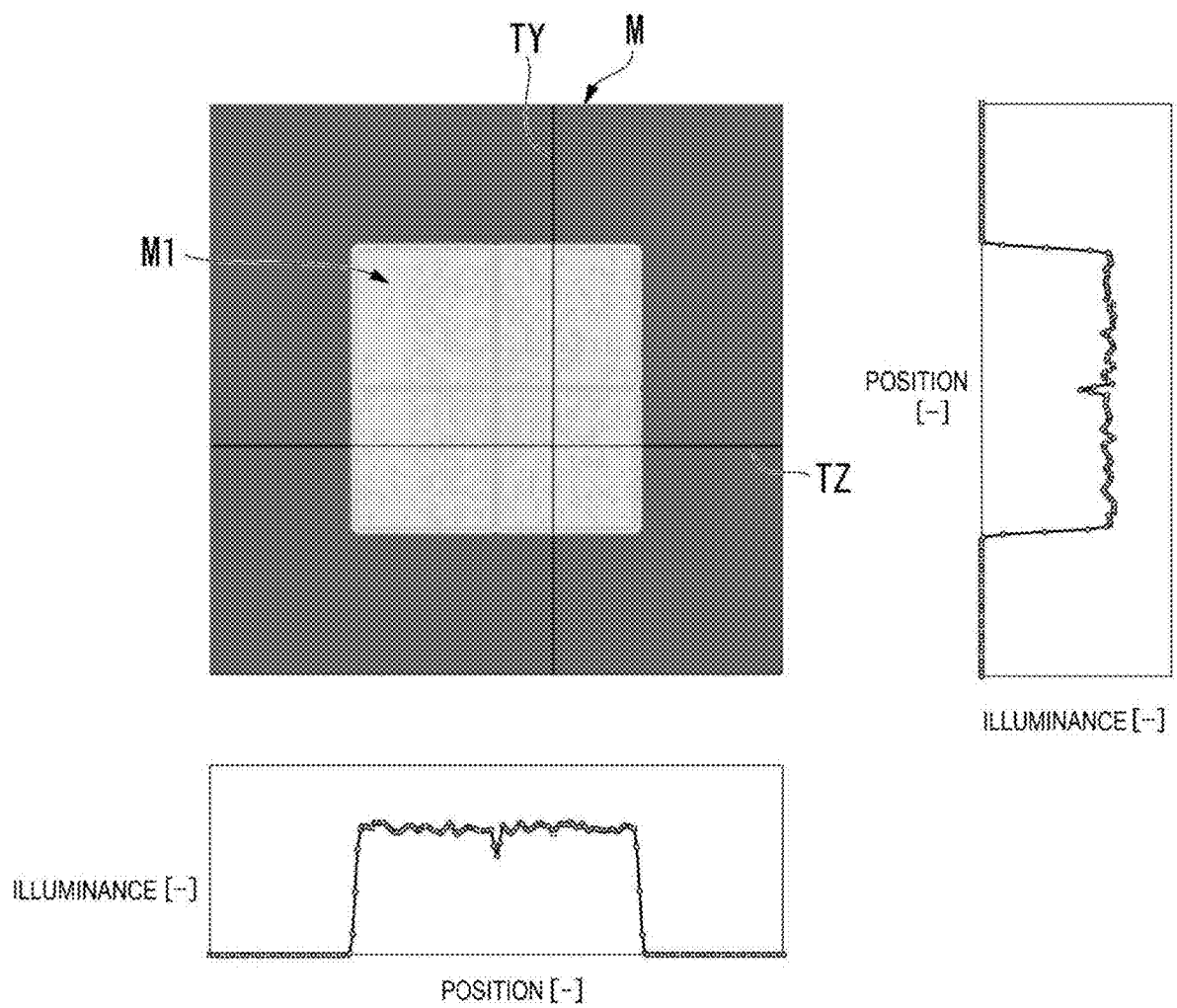
FIG. 7 is a diagram showing an illuminance distribution on an illumination target by the optical element according to the comparative example.

FIG. 7 shows a result of a simulation conducted by the inventors, and is a diagram showing an illuminance distribution on the illumination target due to the optical element 324 according to the comparative example. The graph on the right in FIG. 7 shows an illuminance distribution along a straight line TY (the Y-axis direction), and the graph at the lower side in FIG. 7 shows an illuminance distribution along a straight line TZ (the Z-axis direction).

In the case of the optical element 324 according to the comparative example, since no gap is formed between the partial pencils BLd adjacent to each other on the focal plane F of the second cell 342, although an irradiation area M is also divided into four partial irradiation areas M1 corresponding to the four partial pencils BLd on the illumination target, no gap is formed between the four partial irradiation areas M1 as shown in FIG. 7. Therefore, as shown in the graph of FIG. 7, the illuminance distribution on the illumination target shows a substantially flat distribution which does not have a valley of illuminance in a central portion in the Y-axis direction and a central portion in the Z-axis direction.

For example, when dividing the incident light with the first multi-lens surface into the plurality of partial light beams, and then making all of the partial light beams superimpose a single place on the wavelength conversion element with the second multi-lens surface as in Document 1 described above, the entire area of the wavelength conversion element is illuminated with a substantially homogenous illuminance. On this occasion, since the temperature of the wavelength conversion element uniformly rises, it is difficult for the heat to be released, and there is a problem that the wavelength conversion efficiency decreases with the rise in temperature of the phosphor.

Therefore, when adopting a configuration in which the incident light is divided by the first multi-lens surface into a plurality of partial light beams, and then a plurality of areas different from each other of the wavelength conversion element is irradiated with each of the partial light beams using the second multi-lens surface, it is possible to avoid superimposing all of the partial light beams on a single place of the wavelength conversion element. However, even when adopting this configuration, when there is no gap between the partial irradiation areas M1 adjacent to each other as in the optical element 324 according to the comparative example, the illuminance distribution on the wavelength conversion element is substantially the same as when superimposing all of the partial light beams on the wavelength conversion element. Therefore, it is difficult to suppress the decrease in wavelength conversion efficiency due to the rise in temperature of the phosphor.

Figure 5:
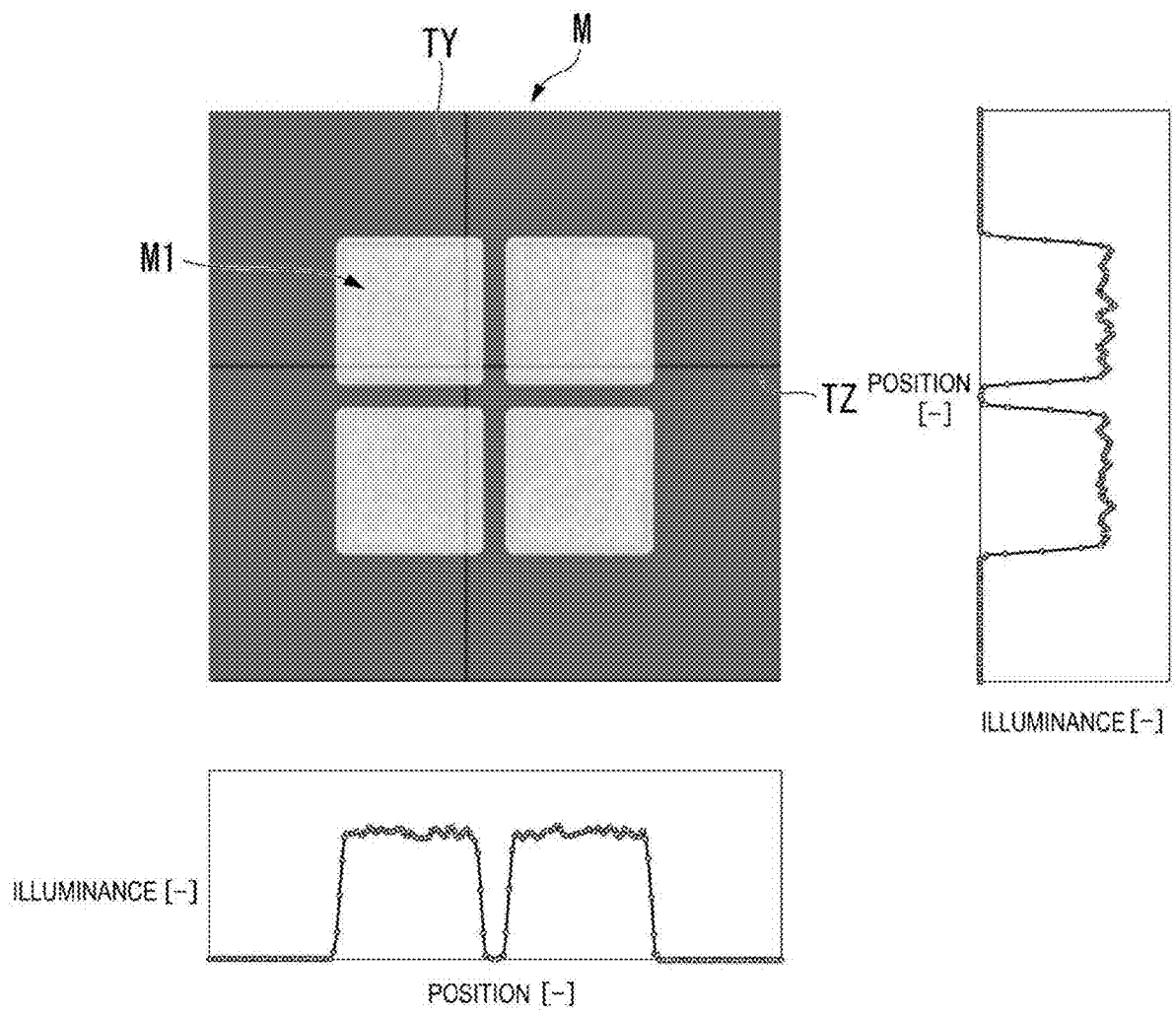
FIG. 5 is a diagram showing an illuminance distribution on an illumination target by the optical element according to the first embodiment.

FIG. 5 shows a result of a simulation conducted by the inventors, and is a diagram showing an illuminance distribution on the illumination target due to the optical element 24 according to the present embodiment. The graph on the right in FIG. 5 shows an illuminance distribution along the straight line TY (the Y-axis direction), and the graph at the lower side in FIG. 5 shows an illuminance distribution along the straight line TZ (the Z-axis direction).

To cope with the problem described above, as shown in FIG. 5, in the case of the optical element 24 according to the present embodiment, since a gap is formed between the partial pencils BLd adjacent to each other in the focal plane F of the second cell 242, the irradiation area M is divided into the four partial irradiation areas M1 corresponding respectively to the four partial pencils BLd, and at the same time, a gap is formed between the partial irradiation areas M1 adjacent to each other also on the illumination target. Therefore, as shown in the two graphs shown in FIG. 5, there can be obtained the illuminance distribution which has the valley of the illuminance in a central portion in both of the Y-axis direction and the Z-axis direction, and is thus clearly divided into the four partial irradiation areas M1.

When using the optical element 324 according to the comparative example, since the entire irradiation area on the wavelength conversion element substantially uniformly rises in temperature, the heat in the vicinity of the central portion of the irradiation area is particularly difficult to be released, and thus, it is difficult to suppress the rise in temperature. In contrast, when using the optical element 24 according to the present embodiment, since the irradiation area M on the wavelength conversion element 40 is divided into the four partial irradiation areas M1 separated from each other, the heat is apt to be released from the central portion of each of the partial irradiation areas M1 toward the rim portion. As a result, it is possible to efficiently suppress the rise in temperature.

Advantages of First Embodiment

The optical element 24 according to the present embodiment is provided with the first multi-lens surface 24A having the m areas arranged in an array, and the second multi-lens surface 24B having the m second cells 242 arranged in an array so as to correspond respectively to the m areas R, the pencil BL enters the first multi-lens surface 24A, the pencil BL is emitted from the second multi-lens surface 24B, the m areas R of the first multi-lens surface 24A each have n first cells 241, the focal plane F of the m second cells 242 is located at the emission side of the n first cells 241, the number m is a natural number no smaller than 2, and the number n is a natural number no smaller than 2.

According to the optical element 24 related to the present embodiment, as described above, the pencil BL illuminates the wavelength conversion element 40 in a state in which the irradiation area M is divided into n partial irradiation areas M1 separated from each other. Further, since the partial pencils BLd emitted from the m second cells 242 are superimposed on each of the n partial irradiation areas M1, it is possible to homogenize the illuminance distribution of the partial irradiation areas M1. Therefore, it is possible to provide the optical element 24 capable of forming the partial irradiation areas M1 which are small in illuminance unevenness, and which are separated from each other.

Further, the light source device 20 according to the present embodiment is provided with the light source 21 for emitting the pencil BL, the optical element 24 which the pencil BL emitted from the light source 21 enters, and the wavelength conversion element 40 which the pencil BL emitted from the optical element 24 enters, and which performs the wavelength conversion on the pencil BL to emit the fluorescence.

According to the light source device 20 related to the present embodiment, since it is possible to efficiently suppress the rise in temperature of the wavelength conversion element 40, it is possible to suppress the decrease in wavelength conversion efficiency due to the rise in temperature of the wavelength conversion element 40.

The description is hereinabove presented focusing attention on the wavelength conversion element 40, but in the case of the present embodiment, substantially the same advantages can be obtained with respect to the diffusely reflecting element 30 as another illumination target. Specifically, the pencil BL illuminates the diffusely reflecting element 30 in the state in which the irradiation area M is divided into 4 partial irradiation areas M1 separated from each other. Thus, since it is possible to effectively suppress the rise in temperature of the diffusely reflecting element 30, it is possible to increase the reliability of the diffusely reflecting element 30.

Further, the optical element 24 according to the present embodiment is provided with the lens array 27 having the first surface 27a which the pencil BL enters, and the second surface 27b from which the pencil BL having entered through the first surface 27a is emitted, the first multi-lens surface 24A is formed of the first surface 27a, and the second multi-lens surface 24B is formed of the second surface 27b.

According to this configuration, since the first multi-lens surface 24A and the second multi-lens surface 24B are formed of the single lens array 27, it is possible to achieve reduction of the number of components of the light source device 20, and at the same time, it is possible to reduce the size of the light source device 20.

Further, the projector 1 according to the present embodiment is provided with the light source device 20, the light modulation devices 4B, 4G, and 4R for modulating the illumination light WL emitted from the light source device 20 in accordance with the image information, and the projection optical device 6 for projecting the light modulated by the light modulation devices 4B, 4G, and 4R.

The projector 1 according to the present embodiment is equipped with the light source device 20 having the advantages described above, and is therefore small in size and excellent in display quality.

Second Embodiment

A second embodiment of the present disclosure will hereinafter be described using FIG. 8, FIG. 9A, and FIG. 9B. Configurations of a projector and an illumination device according to the second embodiment are substantially the same as those in the first embodiment, and a configuration of an optical element is different from that of the first embodiment. Therefore, the description related to the configurations of the projector and the illumination device will be omitted.

Figure 8:
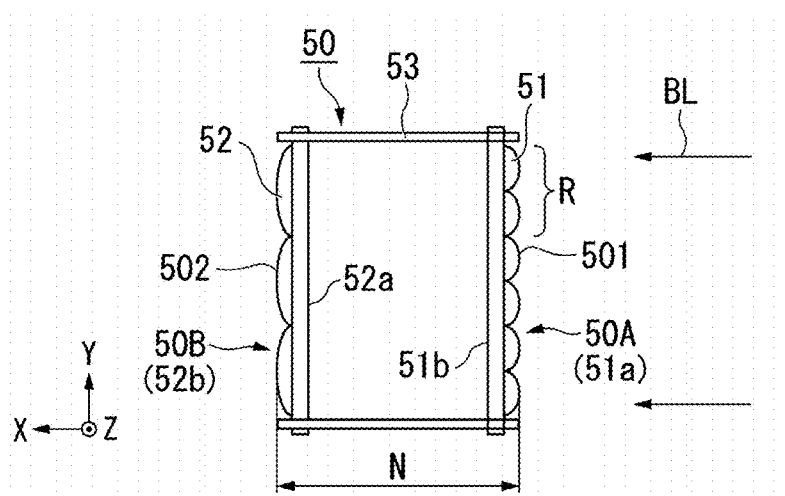
FIG. 8 is a plan view of an optical element according to a second embodiment.

FIG. 8 is a plan view of an optical element 50 according to the present embodiment. FIG. 9A is a plan view of the optical element 50 in a state in which a second lens array 52 is displaced. FIG. 9B is a plan view of the optical element 50 in a state in which a first lens array 51 is displaced.
Configuration of Optical Element As shown in FIG. 8, the optical element 50 according to the present embodiment is provided with a first multi-lens surface 50A having m areas arranged in an array, and a second multi-lens surface 50B having m second cells 502 arranged in an array so as to correspond to the m areas R. In the optical element 50, the pencil BL enters the first multi-lens surface 50A, and is then emitted from the second multi-lens surface 50B. The m areas R of the first multi-lens surface 50A each have n first cells 501. The number m is a natural number no smaller than 2, and the number n is a natural number no smaller than 2.

In the present embodiment, m=9 and n=4 are also assumed similarly to the first embodiment. Further, an arrangement of the first cells 501 and the second cells 502 is substantially the same as that in the first embodiment. The first cells 501 and the second cells 502 each have a shape of a convex lens. All of the first cells 501 constituting the first multi-lens surface 50A have the same size and the same curvature. Further, all of the second cells 502 constituting the second multi-lens surface 50B have the same size and the same curvature.

As a specific configuration, the optical element 50 according to the present embodiment is provided with a first lens array 51, a second lens array 52, and a holding member 53 for holding the first lens array 51 and the second lens array 52.

The first lens array 51 has a third surface 51a which the pencil BL enters, and a fourth surface 51b from which the pencil BL having entered through the third surface 51a is emitted. In the present embodiment, the first multi-lens surface 50A is formed of the third surface 51a. The fourth surface 51b is formed to have a shape like a plane. It should be noted that the first lens array 51 can be disposed so that the incident side and the exit side are flipped. In other words, the first multi-lens surface 50A can be formed of the fourth surface 51b from which the pencil BL is emitted, and the third surface 51a which the pencil BL enters can be formed to have a shape like a plane.

The second lens array 52 has a fifth surface 52a which the pencil BL emitted from the fourth surface 51b of the first lens array 51 enters, and a sixth surface 52b from which the pencil BL having entered through the fifth surface 52a is emitted. In the present embodiment, the second multi-lens surface 50B is formed of the sixth surface 52b. The fifth surface 52a is formed to have a shape like a plane. It should be noted that the second lens array 52 can be disposed so that the incident side and the exit side are flipped from the present embodiment. In other words, the second multi-lens surface 50B can be formed of the fifth surface 52a which the pencil BL enters, and the sixth surface 52b from which the pencil BL is emitted can be formed to have a shape like a plane.

Each of the first lens array 51 and the second lens array 52 can be formed of an inorganic material such as optical glass or quartz, or can also be formed of an organic material such as resin. Further, it is desirable for each of the first lens array 51 and the second lens array 52 to have a frame part for disposing a hole through which the holding member 53 is inserted.

The holding member 53 extends along the X-axis direction as a proceeding direction of the pencil BL, and holds the first lens array 51 and the second lens array 52. Thus, the holding member 53 holds the relative positional relationship between the first lens array 51 and the second lens array 52. Further, in the case of the present embodiment, each of the first lens array 51 and the second lens array 52 is not fixed to a specific position in the holding member 53, but is made displaceable along the extending direction of the holding member 53. Each of the lens arrays 51, 52 can automatically be displaced using a drive source such as a stepping motor, or can also be displaced manually. Alternatively, it is possible to arrange that only either one of the first lens array 51 and the second lens array 52 is made displaceable along the extending direction of the holding member 53.

Figure 9A:
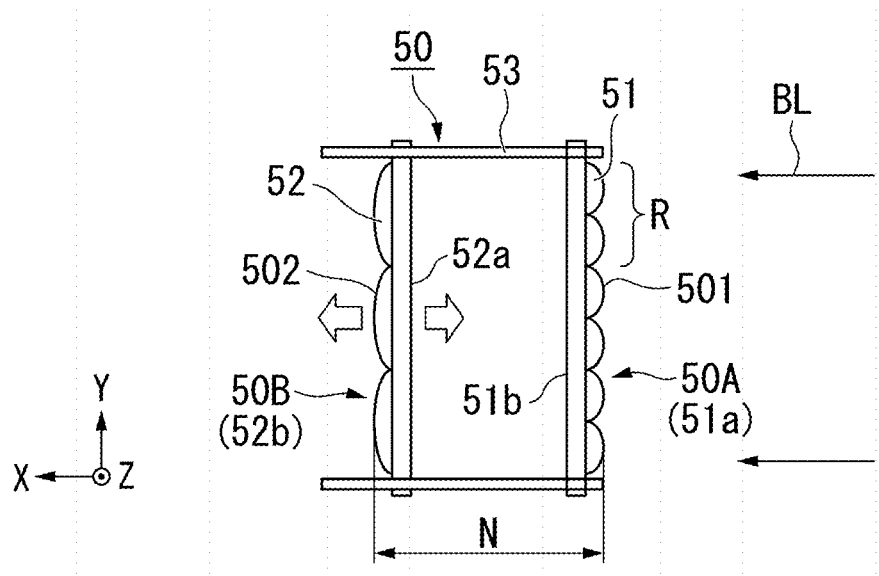
FIG. 9A is a plan view of the optical element in a state in which a second lens array is displaced.
Figure 9B:
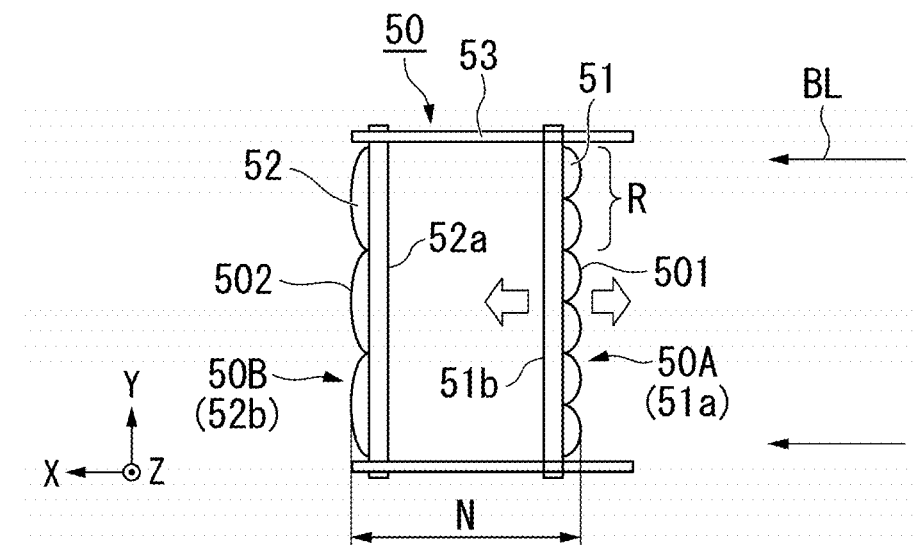
FIG. 9B is a plan view of the optical element in a state in which a first lens array is displaced.

By displacing the second lens array 52 along the extending direction of the holding member 53 as shown in FIG. 9A relatively to the position of the second lens array 52 shown in FIG. 8, it is possible to make the distance N between the first multi-lens surface 50A and the second multi-lens surface 50B in the proceeding direction of the pencil BL variable. Alternatively, by displacing the first lens array 51 along the extending direction of the holding member 53 as shown in FIG. 9B relatively to the position of the first lens array 51 shown in FIG. 8, it is possible to vary the distance N between the first multi-lens surface 50A and the second multi-lens surface 50B in the proceeding direction of the pencil BL. It should be noted that the distance N between the first multi-lens surface 50A and the second multi-lens surface 50B is defined as a distance along the proceeding direction of the pencil BL between a vertex of the first cell 501 constituting the first multi-lens surface 50A and a vertex of the second cell 502 constituting the second multi-lens surface 50B.

By varying the distance N between the first multi-lens surface 50A and the second multi-lens surface 50B in the proceeding direction of the pencil BL in such a manner, it is possible to make the position of the focal plane of the m second cells 502 with respect to the first multi-lens surface 50A in the proceeding direction of the pencil BL variable. It should be noted that also in the case of the present embodiment, the focal plane of the m second cells 502 is located at the emission side of the n first cells 501.

Advantages of Second Embodiment

According also to the optical element 50 related to the present embodiment, the pencil BL illuminates the illumination target in a state in which the irradiation area is divided into the n partial irradiation areas separated from each other. Further, since the partial light beams emitted from the m second cells 502 are superimposed on each of the n partial irradiation areas, it is possible to homogenize the illuminance distribution of the partial irradiation areas. Therefore, there is obtained substantially the same advantage as that of the first embodiment that it is possible to provide the optical element 50 capable of forming the irradiation areas which are low in illuminance unevenness, and are separated from each other.

Further, in the optical element 50 according to the present embodiment, the position of the focal plane of the m second cells 502 with respect to the first multi-lens surface 50A in the proceeding direction of the pencil BL is made variable.

As is understood from FIG. 4, by varying the position of the focal plane of the second cells 502 in the proceeding direction of the pencil BL, it is possible to adjust the distance between the partial light beams adjacent to each other on the focal plane. Thus, it is possible to adjust the distance between the partial irradiation areas adjacent to each other in accordance with, for example, a degree of heat dissipation of the illumination target.

Further, in the optical element 50 according to the present embodiment, since at least one of the first lens array 51 and the second lens array 52 is made displaceable along the extending direction of the holding member 53, the distance N between the first multi-lens surface 50A and the second multi-lens surface 50B in the proceeding direction of the pencil BL is made variable.

According to this configuration, the adjustment of the distance between the irradiation areas adjacent to each other described above can be realized by a relatively simple displacement mechanism.

Third Embodiment

A third embodiment of the present disclosure will hereinafter be described using FIG. 10A and FIG. 10B.

Configurations of a projector and an illumination device according to the third embodiment are substantially the same as those in the first embodiment, and a configuration of an optical element is different from that of the first embodiment. Therefore, the description related to the configurations of the projector and the illumination device will be omitted.

Figure 10A:
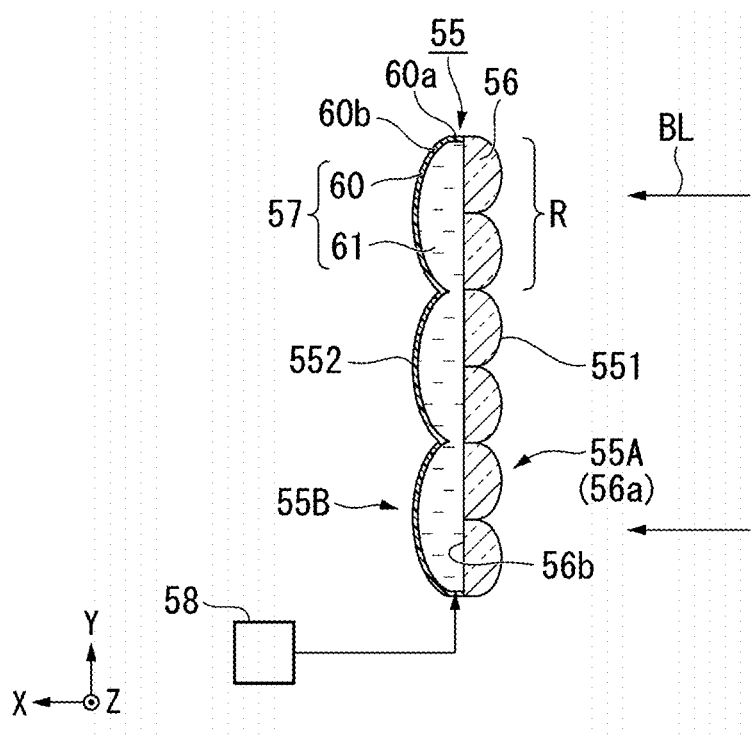
FIG. 10A is a schematic diagram of an optical element according to a third embodiment.
Figure 10B:
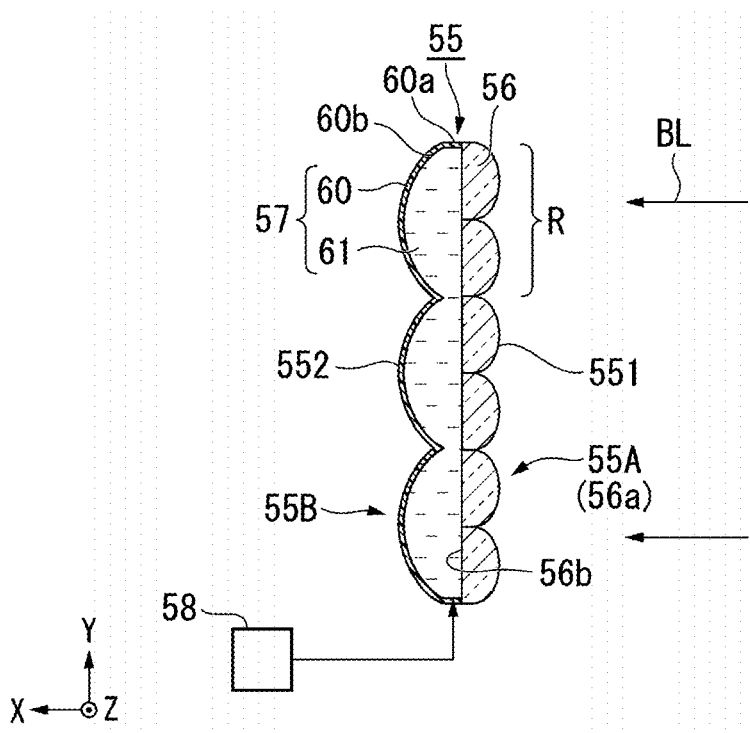
FIG. 10B is a schematic diagram of the optical element when making a curvature of a second cell different from that in FIG. 10A.

FIG. 10A is a schematic diagram of an optical element 55 according to the present embodiment. FIG. 10B is a schematic diagram of the optical element 55 when making a curvature of a second cell 552 different from that in FIG. 10A.

Configuration of Optical Element

As shown in FIG. 10A, the optical element 55 according to the present embodiment is provided with a first multi-lens surface 55A having m areas R arranged in an array, and a second multi-lens surface 55B having m second cells 552 arranged in an array so as to correspond to the m areas R. In the optical element 55, the pencil BL enters the first multi-lens surface 55A, and is then emitted from the second multi-lens surface 55B. The m areas R of the first multi-lens surface 55A each have n first cells 551. The number m is a natural number no smaller than 2, and the number n is a natural number no smaller than 2.

In the present embodiment, m=9 and n=4 are also assumed similarly to the first embodiment. Further, an arrangement of the first cells 551 and the second cells 552 is substantially the same as that in the first embodiment. The first cells 551 and the second cells 552 each have a shape of a convex lens.

As a specific configuration, the optical element 55 according to the present embodiment is provided with a first lens array 56, a second lens array 57, and a pressurizing device 58.

A configuration of the first lens array 56 is substantially the same as that of the first lens array 51 in the second embodiment. Specifically, the first lens array 56 has a third surface 56a which the pencil BL enters, and a fourth surface 56b from which the pencil BL having entered through the third surface 56a is emitted. In the present embodiment, the first multi-lens surface 55A is formed of the third surface 56a. The fourth surface 56b is formed to have a shape like a plane. The first lens array 56 can be formed of an inorganic material such as optical glass or quartz, or can also be formed of an organic material such as resin.

The second lens array 57 is constituted by a light transmissive member 60 and a light transmissive liquid 61. The light transmissive member 60 has a configuration in which a side surface part 60a to be fixed to the fourth surface 56b of the first lens array 56, and a lens part 60b constituting the second multi-lens surface 55B are formed integrally. The light transmissive member 60 is formed of a soft film material having a light transmissive property such as silicone rubber, and is made elastically deformable. The light transmissive liquid 61 is made of a liquid higher in refractive index than 1, for example, silicone oil. The light transmissive liquid 61 fills a space surrounded by the fourth surface 56b of the first lens array 56 and the light transmissive member 60.

The pressurizing device 58 applies pressure on the light transmissive liquid 61 with which the space is filled. The shape of a convex lens of the lens part 60b is formed in a state in which appropriate pressure is applied by the pressurizing device 58 to the light transmissive liquid 61.

In the optical element 55 according to the present embodiment, the degree of the elastic deformation of the light transmissive member 60 can be changed by changing the pressure to be applied to the light transmissive liquid 61, and thus, it is possible to make the curvature of each of the second cells 552 variable. For example, assuming that the state shown in FIG. 10A is an initial state, by increasing the pressure to be applied to the light transmissive liquid 61 to a level higher than the initial state, it is possible to make the bulge of the light transmissive member 60 larger than in the initial state as shown in FIG. 10B, and thus, it is possible to increase the curvature of each of the second cells 552. By increasing the curvature of each of the second cells 552, it is possible to make the position of the focal plane of the m second cells 552 away from the n first cells 551, and therefore, it is possible to increase the gap between the partial irradiation areas adjacent to each other on the illumination target.

Advantages of Third Embodiment

According also to the optical element 55 related to the present embodiment, the pencil BL illuminates the illumination target in a state in which the irradiation area is divided into the n partial irradiation areas separated from each other. Further, since the partial light beams emitted from the m second cells 552 are superimposed on each of the n partial irradiation areas, it is possible to homogenize the illuminance distribution of the partial irradiation areas. Therefore, there is obtained substantially the same advantage as that of the first embodiment that it is possible to provide the optical element 55 capable of forming the partial irradiation areas which are low in illuminance unevenness, and are separated from each other.

Further, also in the optical element 55 according to the present embodiment, the position of the focal plane of the m second cells 552 with respect to the first multi-lens surface 55A in the proceeding direction of the pencil BL is made variable, and therefore, it is possible to obtain substantially the same advantage as that of the second embodiment that it is possible to adjust the distance between the partial irradiation areas adjacent to each other.

Fourth Embodiment

A fourth embodiment of the present disclosure will hereinafter be described using FIG. 11A and FIG. 11B.

Configurations of a projector and an illumination device according to the fourth embodiment are substantially the same as those in the first embodiment, and a configuration of an optical element is different from that of the first embodiment. Therefore, the description related to the configurations of the projector and the illumination device will be omitted.

Figure 11A:
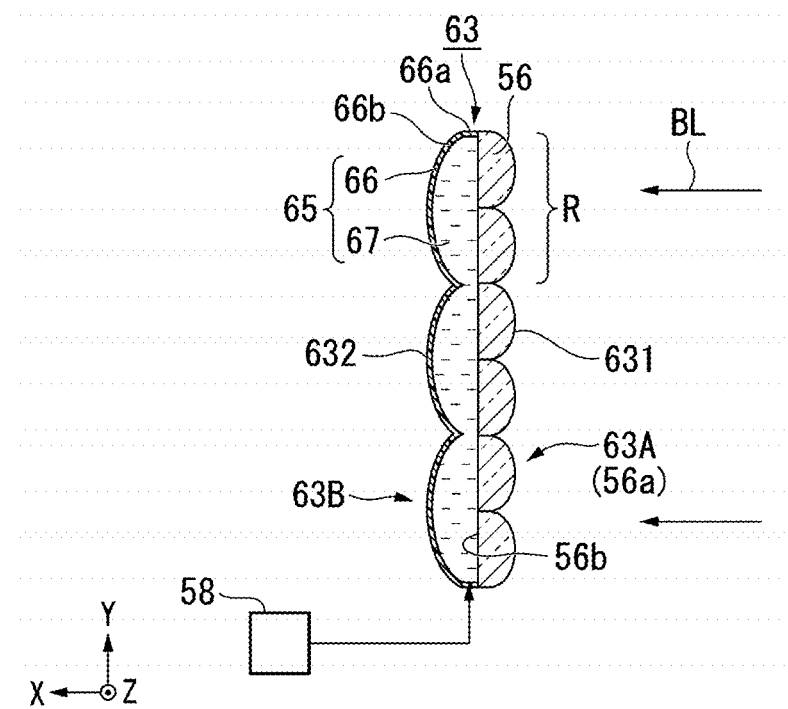
FIG. 11A is a schematic diagram of an optical element according to a fourth embodiment.
Figure 11B:
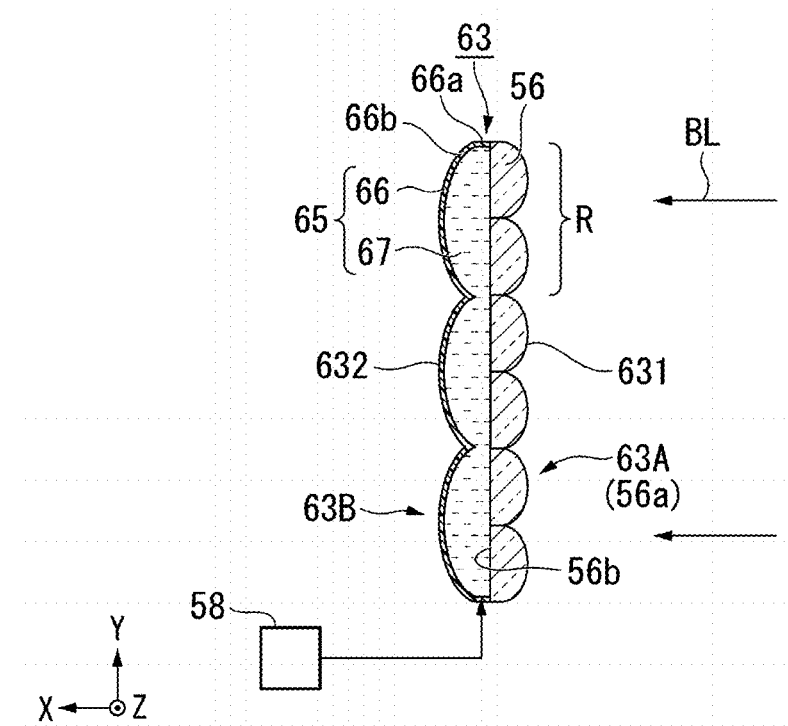
FIG. 11B is a schematic diagram of the optical element when making a refractive index of a light transmissive material different from that in FIG. 11A.

FIG. 11A is a schematic diagram of an optical element 63 according to the present embodiment. FIG. 11B is a schematic diagram of the optical element 63 when making a refractive index of a light transmissive material different from that in FIG. 11A.

Configuration of Optical Element

As shown in FIG. 11A, the optical element 63 according to the present embodiment is provided with a first multi-lens surface 63A having m areas R arranged in an array, and a second multi-lens surface 63B having m second cells 632 arranged in an array so as to correspond to the m areas R. In the optical element 63, the pencil BL enters the first multi-lens surface 63A, and is then emitted from the second multi-lens surface 63B. The m areas R of the first multi-lens surface 63A each have n first cells 631. The number m is a natural number no smaller than 2, and the number n is a natural number no smaller than 2.

In the present embodiment, m=9 and n=4 are also assumed similarly to the first embodiment. Further, an arrangement of the first cells 631 and the second cells 632 is substantially the same as that in the first embodiment. The first cells 631 and the second cells 632 each have a shape of a convex lens.

As a specific configuration, the optical element 63 according to the present embodiment is provided with the first lens array 56, a second lens array 65, and the pressurizing device 58.

A configuration of the first lens array 56 is substantially the same as that of the first lens array 56 in the third embodiment. Specifically, the first lens array 56 has the third surface 56a which the pencil BL enters, and the fourth surface 56b from which the pencil BL having entered through the third surface 56a is emitted. In the present embodiment, the first multi-lens surface 63A is formed of the third surface 56a. The fourth surface 56b is formed to have a shape like a plane. The first lens array 56 can be formed of an inorganic material such as optical glass or quartz, or can also be formed of an organic material such as resin.

The second lens array 65 is constituted by a light transmissive member 66 and a light transmissive material 67. The light transmissive member 66 has a configuration in which a side surface part 66a to be fixed to the fourth surface 56b of the first lens array 56, and a lens part 66b constituting the second multi-lens surface 63B are formed integrally. The light transmissive member 66 is formed of a hard material having a light transmissive property such as optical glass. The light transmissive material 67 is made of a liquid higher in refractive index than 1, for example, silicone oil. The light transmissive material 67 fills a space surrounded by the fourth surface 56b of the first lens array 56 and the light transmissive member 66.

The pressurizing device 58 is substantially the same as the pressurizing device 58 in the third embodiment. The pressurizing device 58 applies pressure on the light transmissive material 67 with which the space is filled.

In the optical element 63 according to the present embodiment, the refractive index of the light transmissive material 67 can be made variable by changing the pressure to be applied to the light transmissive material 67, and thus, it is possible to vary the focal distance of each of the second cells 632 variable. For example, assuming that the state shown in FIG. 11A is an initial state, by increasing the pressure to be applied to the light transmissive material 67 to a level higher than the initial state, it is possible to make the refractive index of the light transmissive material 67 larger than in the initial state as shown in FIG. 11B, and thus, it is possible to shorten the focal distance of each of the second cells 632. By shortening the focal distance of each of the second cells 632, it is possible to make the position of the focal plane of the m second cells 632 away from the n first cells 631, and therefore, it is possible to increase the gap between the partial irradiation areas adjacent to each other on the illumination target.

Advantages of Fourth Embodiment

According also to the optical element 63 related to the present embodiment, the pencil BL illuminates the illumination target in a state in which the irradiation area is divided into the n partial irradiation areas separated from each other. Further, since the partial light beams emitted from the m second cells 632 are superimposed on each of the n partial irradiation areas, it is possible to homogenize the illuminance distribution of the partial irradiation areas. Therefore, there is obtained substantially the same advantage as that of the first embodiment that it is possible to provide the optical element 63 capable of forming the partial irradiation areas which are low in illuminance unevenness, and are separated from each other.

Further, also in the optical element 63 according to the present embodiment, the position of the focal plane of the m second cells 632 with respect to the first multi-lens surface 63A in the proceeding direction of the pencil BL is made variable, and therefore, it is possible to obtain substantially the same advantage as that of the second embodiment that it is possible to adjust the distance between the partial irradiation areas adjacent to each other.

First Modified Example

An optical element according to a first modified example will hereinafter be described using FIG. 12 and FIG. 13.

Figure 12:
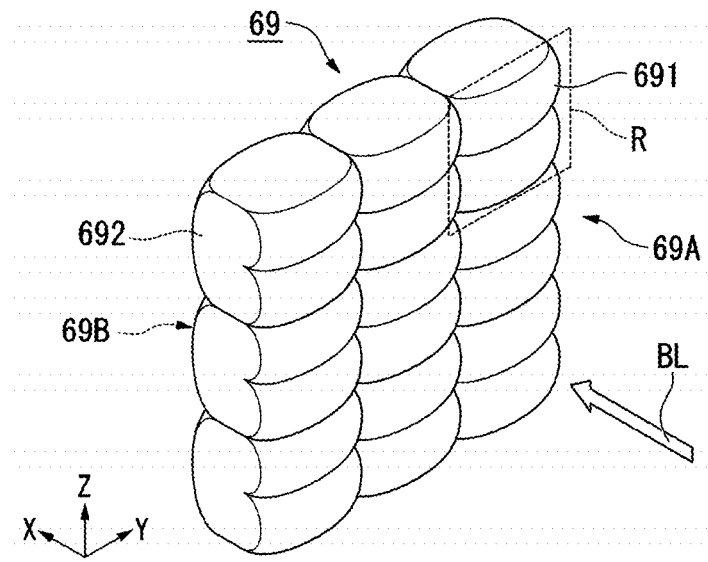
FIG. 12 is a perspective view of an optical element according to a first modified example.

FIG. 12 is a perspective view of the optical element 69 according to the first modified example.

As shown in FIG. 12, the optical element 69 according to the first modified example is provided with a first multi-lens surface 69A having m areas R arranged in an array, and a second multi-lens surface 69B having m second cells 692 arranged in an array so as to correspond to the m areas R. In the optical element 69, the pencil BL enters the first multi-lens surface 69A, and is then emitted from the second multi-lens surface 69B. The m areas R of the first multi-lens surface 69A each have n first cells 691. The number m is a natural number no smaller than 2, and the number n is a natural number no smaller than 2.

In the first modified example, m=9 and n=2 are assumed. In other words, the first multi-lens surface 69A has a configuration in which nine areas R are arranged in an array of a 3×3 matrix. Further, the nine areas R of the first multi-lens surface 69A each have the two first cells 691. The two first cells 691 provided to each of the areas R are arranged side by side in the Z-axis direction. Therefore, as a whole, the first multi-lens surface 69A has a configuration in which 18 first cells 691 are arranged in an array of a 3×6 matrix. The second multi-lens surface 69B is substantially the same as that of the embodiment described above.

Figure 13:
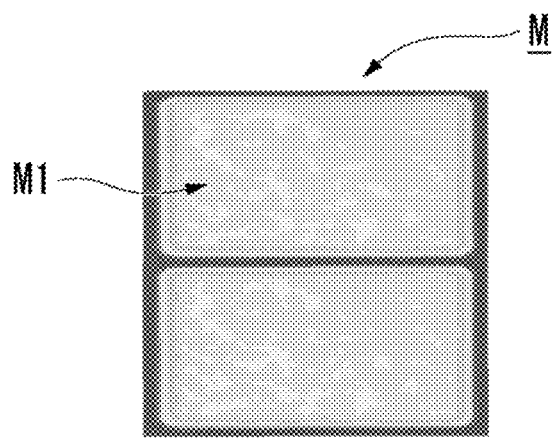
FIG. 13 is a diagram showing an illuminance distribution on an illumination target by the optical element according to the first modified example.

FIG. 13 shows a result of a simulation conducted by the inventors, and is a diagram showing an illuminance distribution on the illumination target due to the optical element 69 according to the first modified example.

As shown in FIG. 13, in the case of the optical element 69 according to the first modified example, the configuration of the first multi-lens surface 69A described above is reflected, and the entire irradiation area M is divided into the two partial irradiation areas M1, and at the same time, a gap is formed between the two partial irradiation areas M1 also on the illumination target.

Second Modified Example

An optical element according to a second modified example will hereinafter be described using FIG. 14.

It should be noted that in the second modified example, a third modified example, a fourth modified example, and a fifth modified example described below, the illustration of the optical element is omitted, and only the illuminance distribution on the illumination target is described.

The optical element according to the second modified example is provided with a first multi-lens surface having m areas arranged in an array, and a second multi-lens surface having m second cells arranged in an array so as to correspond to the m areas. In the second modified example, m=9 and n=3 are assumed. In other words, the nine areas of the first multi-lens surface each have the three first cells. The three first cells provided to each of the areas are arranged side by side in the Y-axis direction.

Figure 14:
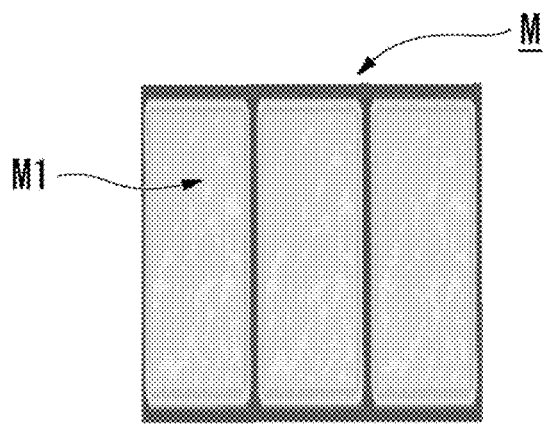
FIG. 14 is a diagram showing an illuminance distribution on an illumination target by the optical element according to a second modified example.

As shown in FIG. 14, in the case of the optical element according to the second modified example, the configuration of the first multi-lens surface described above is reflected, and the entire irradiation area M is divided into the three partial irradiation areas M1, and at the same time, a gap is formed between the partial irradiation areas M1 adjacent to each other also on the illumination target.

Third Modified Example

Figure 15:
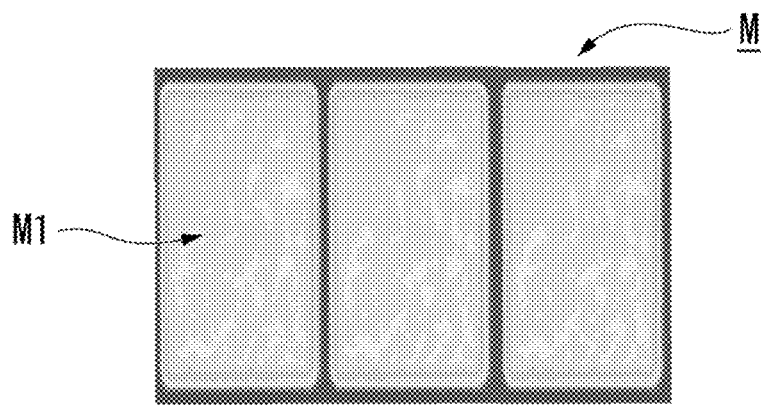
FIG. 15 is a diagram showing an illuminance distribution on an illumination target by the optical element according to a third modified example.

An optical element according to a third modified example will hereinafter be described using FIG. 15.

The optical element according to the third modified example is provided with a first multi-lens surface having m areas arranged in an array, and a second multi-lens surface having m second cells arranged in an array so as to correspond to the m areas. In the third modified example, m=9 and n=3 are assumed similarly to the second modified example. In other words, the nine areas of the first multi-lens surface each have the three first cells. The three first cells provided to each of the areas are arranged side by side in the Y-axis direction.

Although the illumination target having a square shape is assumed in the embodiments and the modified examples described above, in the third modified example, there is assumed the illumination target having a rectangular shape. As shown in FIG. 15, in the case of the optical element according to the third modified example, the configuration of the first multi-lens surface described above is reflected, and the entire irradiation area M is divided into the three partial irradiation areas M1, and at the same time, a gap is formed between the partial irradiation areas M1 adjacent to each other also on the illumination target having the rectangular shape.

Fourth Modified Example

An optical element according to a fourth modified example will hereinafter be described using FIG. 16.

The optical element according to the fourth modified example is provided with a first multi-lens surface having m areas arranged in an array, and a second multi-lens surface having m second cells arranged in an array so as to correspond to the m areas. In the fourth modified example, m=9 and n=9 are assumed. In other words, the nine areas of the first multi-lens surface each have the nine first cells. The nine first cells provided to each of the areas are arranged in an array of a 3×3 matrix.

Figure 16:
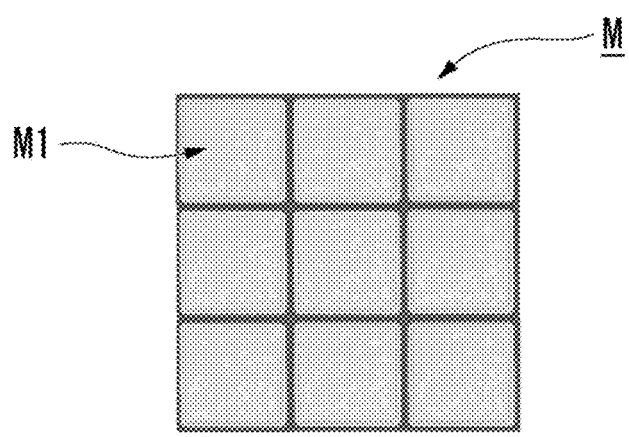
FIG. 16 is a diagram showing an illuminance distribution on an illumination target by the optical element according to a fourth modified example.

As shown in FIG. 16, in the case of the optical element according to the fourth modified example, the configuration of the first multi-lens surface described above is reflected, and the entire irradiation area M is divided into the nine partial irradiation areas M1, and at the same time, a gap is formed between the partial irradiation areas M1 adjacent to each other also on the illumination target.

Fifth Modified Example

An optical element according to a fifth modified example will hereinafter be described using FIG. 17.

The optical element according to the fifth modified example is provided with a first multi-lens surface having m areas arranged in an array, and a second multi-lens surface having m second cells arranged in an array so as to correspond to the m areas. In the fifth modified example, m=9 and n=3 are assumed. In other words, the nine areas of the first multi-lens surface each have the three first cells. In the three first cells provided to each of the areas, the two first cells each having a square shape are disposed side by side in the Z-axis direction in an area adjacent in the Y-axis direction to the first cell having a rectangular shape.

Figure 17:
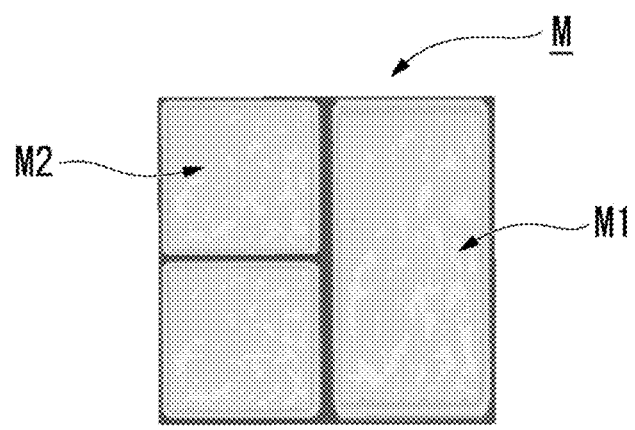
FIG. 17 is a diagram showing an illuminance distribution on an illumination target by the optical element according to a fifth modified example.

As shown in FIG. 17, in the case of the optical element according to the fifth modified example, the configuration of the first multi-lens surface described above is reflected, and the entire irradiation area M is divided into the three partial irradiation areas M1, M2, and at the same time, a gap is formed between the partial irradiation areas adjacent to each other also on the illumination target.

Sixth Modified Example

An optical element according to a sixth modified example will hereinafter be described using FIG. 18 and FIG. 19.

Figure 18:
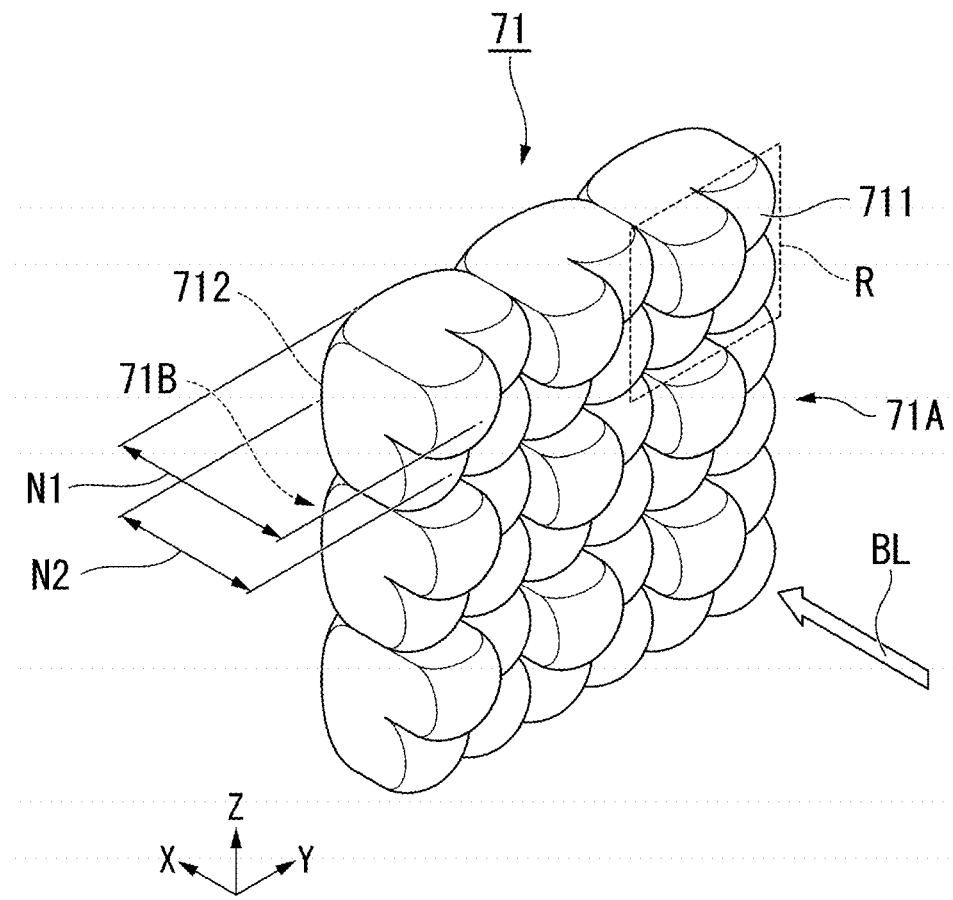
FIG. 18 is a perspective view of an optical element according to a sixth modified example.

FIG. 18 is a perspective view of the optical element 71 according to the sixth modified example.

As shown in FIG. 18, the optical element 71 according to the sixth modified example is provided with a first multi-lens surface 71A having m areas R arranged in an array, and a second multi-lens surface 71B having m second cells 712 arranged in an array so as to correspond to the m areas R. In the optical element 71, the pencil BL enters the first multi-lens surface 71A, and is then emitted from the second multi-lens surface 71B. The m areas R of the first multi-lens surface 71A each have n first cells 711.

In the sixth modified example, m=9 and n=4 are assumed. In other words, the nine areas R of the first multi-lens surface 71A each have the four first cells 711. The four first cells 711 provided to each of the areas Rare arranged in an array of a 2×2 matrix. Therefore, as a whole, the first multi-lens surface 71A has a configuration in which 36 first cells 711 are arranged in an array of a 6×6 matrix. The second multi-lens surface 71B is substantially the same as that of the embodiment described above.

In the sixth modified example, out of the four first cells 711 provided to each of the areas R, a distance N1 between one of the first cells 711 and the second cell 712 is longer than a distance N2 between three others of the first cells 711 and the second cell 712. Therefore, the distance between that one of the first cells 711 and the focal plane of the second cell 712 is longer than a distance between the three others of the first cells 711 and the focal plane of the second cell 712. It should be noted that the curvature of the one of the first cells 711 and the curvature of the three others of the first cells 711 can be the same as each other, or can be different from each other.

Figure 19:
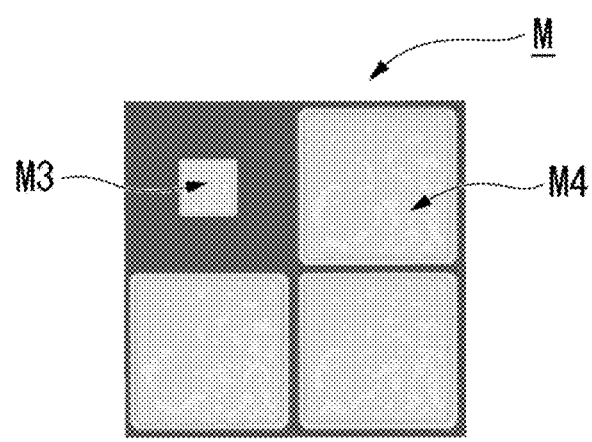
FIG. 19 is a diagram showing an illuminance distribution on an illumination target by the optical element according to the sixth modified example.

Thus, in the case of the optical element 71 according to the sixth modified example, as shown in FIG. 19, the configuration of the first multi-lens surface 71A is reflected, and the entire irradiation area M is divided into the four partial irradiation areas M3, M4, and at the same time, the area of the partial irradiation area M3 out of the four partial irradiation areas M3, M4 becomes smaller than the area of each of the three other partial irradiation areas M4, and thus, only the gap between the partial irradiation area M3 and the partial irradiation area M4 adjacent to each other becomes larger. In such a manner, it is also possible to make only some of the partial irradiation areas different in area from the other of the partial irradiation areas.

It should be noted that the scope of the present disclosure is not limited to the embodiments described above, but a variety of modifications can be provided thereto within the scope or the spirit of the present disclosure.

For example, in the embodiments described above, there is cited the example in which the optical element according to an aspect of the present disclosure is applied as a member for illuminating the wavelength conversion element and the diffusely reflecting element of the light source device, but it is possible to apply the optical element to, for example, the integrator optical system 31 shown in FIG. 2 instead of this configuration.

In this case, the illumination target of the optical element is the light modulation devices 4B, 4G, and 4R constituting the projector 1 shown in FIG. 1. As a technical significance of illuminating the light modulation devices 4B, 4G, and 4R with the plurality of partial irradiation areas separated from each other, it is conceivable when, for example, projecting a plurality of windows on the screen. In this case, since a plurality of image formation areas is disposed within an effective display area of the light modulation device, and no image is formed in an area except the plurality of image formation areas, there is no problem even when the area is not irradiated with the illumination light. Alternatively, the optical element according to an aspect of the present disclosure can be implemented not only when projecting the plurality of windows, but also when displaying an image having a bright display area and a dark display area separated from each other in a single window. By applying the optical element according to an aspect of the present disclosure to the integrator optical system of the projector in such a manner, it is possible to realize the projector which does not illuminate an unnecessary area, and is high in use efficiency of the illumination light.

Further, in the second embodiment, there is described the configuration in which at least one of the first lens array and the second lens array is made displaceable along the extending direction of the holding member, and the focal plane position of the second cell can be adjusted, but the first lens array and the second lens array are not necessarily required to be displaceable along the extending direction of the holding member. For example, it is possible to adopt a configuration in which the first lens array and the second lens array are fixed to the holding member after the position of the focal plane of the second cell is arbitrarily adjusted, and the first lens array and the second lens array cannot thereafter be displaced.

Further, in the third embodiment and the fourth embodiment, the first lens array and the second lens array are formed of an integrated member, but the first lens array and the second lens array can be formed of separate bodies.

Further, in the embodiments described above, there is shown the example in which the optical element according to an aspect of the present disclosure is applied to the illumination device having the configuration in which the light emitted from the light source is branched by the polarization split element into two light beams, one of the light beams is made to enter the wavelength conversion element, the other of the light beams is made to enter the diffusely reflecting element, and the fluorescence emitted from the wavelength conversion element and the blue light emitted from the diffusely reflecting element are combined by the polarization split element. Instead of this configuration, it is possible to apply the optical element according to an aspect of the present disclosure to an illumination device having a configuration in which the blue light emitted from the light source is made to enter the wavelength conversion element, a part of the blue light is used as the excitation light, another part of the blue light which does not make a contribution as the excitation light is back-scattered, and the fluorescence emitted from the wavelength conversion element and the blue light are taken out.

Further, in the embodiments described above, there is cited an example of the stationary wavelength conversion element which is not made rotatable, but the aspect of the present disclosure can also be applied to a light source device having a wavelength conversion element which is made rotatable using a motor. Further, there is cited an example of the stationary diffusely reflecting element which is not made rotatable, but the aspect of the present disclosure can also be applied to a light source device having a diffusely reflecting element which is made rotatable using a motor.

Further, although in the embodiments described above, there is described the example of installing the optical element according to the aspect of the present disclosure in the projector using the liquid crystal light valves, the example is not a limitation. The optical element according to the aspect of the present disclosure can be applied to a projector using digital micromirror devices as the light modulation devices. Further, the projector is not required to have a plurality of light modulation devices, and can be provided with just one light modulation device.

Besides the above, the specific configurations of the number, the arrangement, the shape, the material, and so on of each of the constituents constituting the light source device and the projector are not limited to those of the embodiments described above, but can arbitrarily be modified.

Further, although in the embodiments described above, there is described the example of applying the light source device according to an aspect of the present disclosure to the projector, the example is not a limitation. The light source device according to an aspect of the present disclosure can also be applied to a light source device such as lighting equipment or a headlight of a vehicle. In this case, it is possible for the light source device of this kind to be provided with a light source, the optical element according to an aspect of the present disclosure, and a light modulation element for adjusting the illuminance of the light emitted from the optical element.

It is possible for an optical element according to an aspect of the present disclosure to have the following configuration.

The optical element according to the aspect of the present disclosure includes a first multi-lens surface having m areas arranged in an array, and a second multi-lens surface having m second cells arranged in an array so as to correspond to the m areas, wherein light enters the first multi-lens surface, the light is emitted from the second multi-lens surface, the m areas of the first multi-lens surface each have n first cells, a focal plane of the m second cells is located at an emission side of the n first cells, the number m is a natural number no smaller than 2, and the number n is a natural number no smaller than 2.

In the optical element according to the aspect of the present disclosure, there may further be included a lens array having a first surface which the light enters, and a second surface from which the light entering through the first surface is emitted, the first multi-lens surface may be formed of the first surface, and the second multi-lens surface may be formed of the second surface.

In the optical element according to the aspect of the present disclosure, a position of the focal plane of the m second cells with respect to the first multi-lens surface in a proceeding direction of the light may be variable.

In the optical element according to the aspect of the present disclosure, a distance between the first multi-lens surface and the second multi-lens surface in a proceeding direction of the light may be variable.

In the optical element according to the aspect of the present disclosure, there may further be included a first lens array having a third surface which the light enters, and a fourth surface from which the light entering through the third surface is emitted, a second lens array having a fifth surface which the light emitted from the fourth surface enters, and a sixth surface from which the light entering through the fifth surface is emitted, and a holding member configured to hold the first lens array and the second lens array, the first multi-lens surface may be formed of one of the third surface and the fourth surface, the second multi-lens surface may be formed of one of the fifth surface and the sixth surface, and a distance between the first lens array and the second lens array in a proceeding direction of the light may be variable.

In the optical element according to the aspect of the present disclosure, a curvature of each of the m second cells may be variable.

In the optical element according to the aspect of the present disclosure, a refractive index of a light transmissive material disposed between the first multi-lens surface and the second multi-lens surface may be variable.

It is also possible for a light source device according to another aspect of the present disclosure to have the following configuration.

The light source device according to the aspect of the present disclosure includes a light source configured to emit light, and the optical element according to the aspect of the present disclosure which the light emitted from the light source enters.

The light source device according to the aspect of the present disclosure includes a light source configured to emit excitation light, the optical element according to the aspect of the present disclosure which the excitation light emitted from the light source enters, and a wavelength conversion element which the excitation light emitted from the optical element enters, and which performs wavelength conversion on the excitation light to emit fluorescence.

The light source device according to the aspect of the present disclosure includes a light source configured to emit light, the optical element according to the aspect of the present disclosure which the light emitted from the light source enters, and a light modulation element configured to modulate the light emitted from the optical element.

It is also possible for an image display device according to another aspect of the present disclosure to have the following configuration.

The image display device according to another aspect of the present disclosure includes a light source configured to emit light, the optical element according to the aspect of the present disclosure which the light emitted from the light source enters, and a light modulation device configured to modulate the light emitted from the optical element in accordance with image information.

It is possible for a projector according to still another aspect of the present disclosure to have the following configuration.

The projector according to the aspect of the present disclosure includes the light source device according to the aspect of the present disclosure, a light modulation device configured to modulate the light emitted from the light source device in accordance with image information, and a projection optical device configured to project the light modulated by the light modulation device.

What is claimed is:
1. An optical element comprising:
a first multi-lens surface having m areas arranged in an array; the m areas including a plurality of first cells, and
a second multi-lens surface having m second cells arranged in an array, the m second cells corresponding to the m areas, wherein
light enters the first multi-lens surface,
the light is emitted from the second multi-lens surface, the m areas of the first multi-lens surface each have n first cells,
a focal plane of the m second cells is located at an emission side of the n first cells,
the number m is a natural number no smaller than 2,
the number n is a natural number no smaller than 2, and
each first cell of the plurality of first cells has a same length in a direction perpendicular to a direction in which light travels.

2. The optical element according to claim 1, further comprising:
a lens array having a first surface which the light enters, and a second surface from which the light entering through the first surface is emitted, wherein
the first multi-lens surface is formed of the first surface, and
the second multi-lens surface is formed of the second surface.

3. The optical element according to claim 1, wherein a position of the focal plane of the m second cells with respect to the first multi-lens surface is variable in a proceeding direction of the light.

4. The optical element according to claim 3, wherein a distance between the first multi-lens surface and the second multi-lens surface is variable in the proceeding direction of the light.

5. The optical element according to claim 4, further comprising:
a first lens array having a third surface which the light enters, and a fourth surface from which the light entering through the third surface is emitted;
a second lens array having a fifth surface which the light emitted from the fourth surface enters, and a sixth surface from which the light entering through the fifth surface is emitted; and
a holding member configured to hold the first lens array and the second lens array, wherein
the first multi-lens surface is formed of one of the third surface and the fourth surface,
the second multi-lens surface is formed of one of the fifth surface and the sixth surface, and
a distance between the first lens array and the second lens array is variable in the proceeding direction of the light.

6. The optical element according to claim 3, wherein a curvature of each of the m second cells is variable.

7. The optical element according to claim 3, wherein a refractive index of a light transmissive material disposed between the first multi-lens surface and the second multi-lens surface is variable.

8. A light source device comprising:
a light source configured to emit light; and
the optical element according to claim 1 which the light emitted from the light source enters.

9. A projector comprising:
the light source device according to claim 8;
a light modulation device configured to modulate the light emitted from the light source device in accordance with image information; and
a projection optical device configured to project the light modulated by the light modulation device.

10. A light source device comprising:
a light source configured to emit excitation light;
the optical element according to claim 1 which the excitation light emitted from the light source enters; and
a wavelength conversion element configured to convert a wavelength of the excitation light emitted from the optical element and emit converted light.

11. A projector comprising:
the light source device according to claim 10;
a light modulation device configured to modulate the light emitted from the light source device in accordance with image information; and
a projection optical device configured to project the light modulated by the light modulation device.

12. A light source device comprising:
a light source configured to emit light;
the optical element according to claim 1 which the light emitted from the light source enters; and
a light modulation element configured to modulate the light emitted from the optical element.

13. A projector comprising:
the light source device according to claim 12;
a light modulation device configured to modulate the light emitted from the light source device in accordance with image information; and
a projection optical device configured to project the light modulated by the light modulation device.

14. An image display device comprising:
a light source configured to emit light;
the optical element according to claim 1 which the light emitted from the light source enters; and
a light modulation device configured to modulate the light emitted from the optical element in accordance with image information.

* * * * *